(12) United States Patent
Zaima

(10) Patent No.: US 8,977,143 B2
(45) Date of Patent: Mar. 10, 2015

(54) IMAGE FORMING APPARATUS WHICH PERFORMS CALIBRATION FOR MAINTAINING IMAGE QUALITY

(75) Inventor: Nobuhiko Zaima, Kashiwa (JP)

(73) Assignee: Canon Kabushiki Kaisha, Toyko (JP)

( * ) Notice: Subject to any disclaimer, the term of this patent is extended or adjusted under 35 U.S.C. 154(b) by 326 days.

(21) Appl. No.: 13/175,064

(22) Filed: Jul. 1, 2011

(65) Prior Publication Data

US 2012/0020680 A1 Jan. 26, 2012

(30) Foreign Application Priority Data

Jul. 22, 2010 (JP) .................................. 2010-165343
Apr. 27, 2011 (JP) .................................. 2011-100138

(51) Int. Cl.
*G03G 15/00* (2006.01)
*H04N 1/60* (2006.01)

(52) U.S. Cl.
CPC ........... *H04N 1/6033* (2013.01); *H04N 1/6097* (2013.01)
USPC .......................................................... 399/15

(58) Field of Classification Search
CPC ... G03G 15/00; G03G 15/01; G03G 15/0541; G03G 15/5058; G03G 15/5062; G03G 15/00029
USPC ............. 399/9, 15, 31, 32, 38, 39, 43, 45, 51, 399/59, 72
See application file for complete search history.

(56) References Cited

U.S. PATENT DOCUMENTS

| 5,512,986 | A | 4/1996 | Toyomura et al. |
| 5,805,272 | A | 9/1998 | Nozawa et al. |
| 6,456,803 | B2 | 9/2002 | Suzuki et al. |
| 7,177,558 | B2 * | 2/2007 | Tanaka et al. ................... 399/39 |
| 7,385,737 | B2 | 6/2008 | Zaima |
| 7,398,025 | B2 * | 7/2008 | Campbell et al. ............... 399/49 |
| 2002/0085235 | A1 | 7/2002 | Degani et al. |
| 2005/0007609 | A1 | 1/2005 | Itagaki et al. |
| 2005/0117927 | A1 | 6/2005 | Tanaka et al. |

(Continued)

FOREIGN PATENT DOCUMENTS

| EP | 0674427 B1 | 6/2000 |
| EP | 2264546 A2 | 12/2010 |

(Continued)

OTHER PUBLICATIONS

Search Report issued on Nov. 9, 2011, in counterpart European Patent Application No. 11172980.2.

(Continued)

*Primary Examiner* — Benjamin Schmitt
*Assistant Examiner* — Matthew Miller
(74) *Attorney, Agent, or Firm* — Fitzpatrick, Cella, Harper & Scinto

(57) ABSTRACT

An image forming apparatus forms a pattern image on a first printing medium and creates a first image processing condition for adjusting a tone characteristic based on a first luminance value. When performing the calibration using a second printing medium different from the first printing medium, the apparatus corrects, based on a luminance value of a background region of the second printing medium, a second luminance value output in accordance with light reflected by the second printing medium, and creates the first image processing condition based on the corrected second luminance value.

8 Claims, 18 Drawing Sheets

(56) References Cited

U.S. PATENT DOCUMENTS

| | | |
|---|---|---|
| 2005/0225784 A1 | 10/2005 | Jacob et al. |
| 2007/0229923 A1 | 10/2007 | Itagaki et al. |
| 2010/0003044 A1* | 1/2010 | Burry et al. .................... 399/74 |
| 2011/0109920 A1* | 5/2011 | Nakase .......................... 358/1.5 |

FOREIGN PATENT DOCUMENTS

| | | |
|---|---|---|
| JP | 06-175452 A | 6/1994 |
| JP | 07-261479 A | 10/1995 |
| JP | 08-287217 A | 11/1996 |
| JP | 09-149256 A | 6/1997 |
| JP | 2004-128556 A | 4/2004 |
| JP | 2005-303701 A | 10/2005 |
| JP | 2006-035645 A | 2/2006 |
| JP | 2008-203424 A | 9/2008 |

OTHER PUBLICATIONS

Aug. 21, 2013 Chinese Office Action in Chinese Application No. 201110201303.6.

* cited by examiner

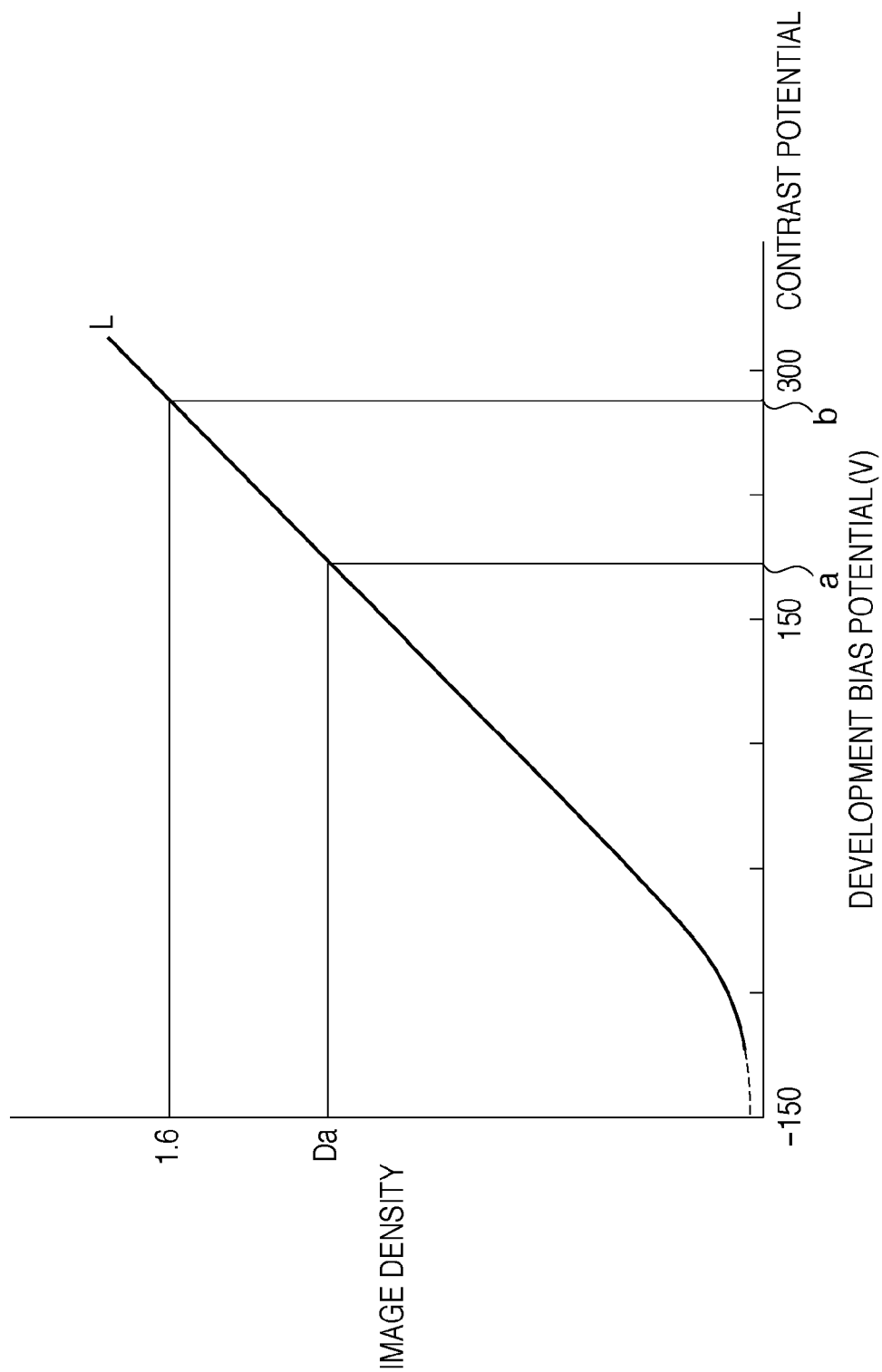

F I G. 12
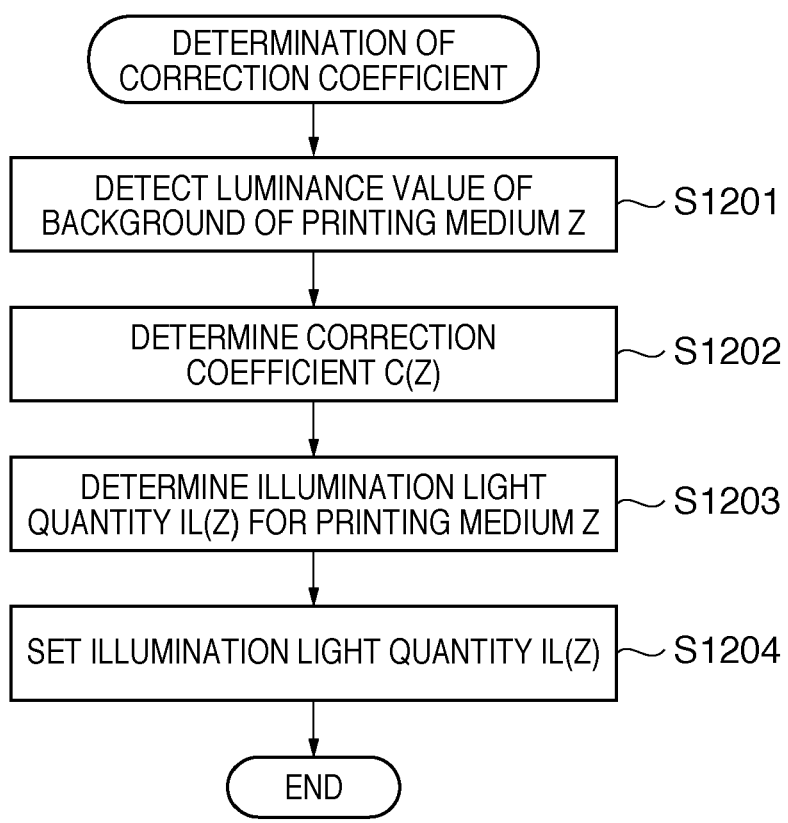

F I G. 14
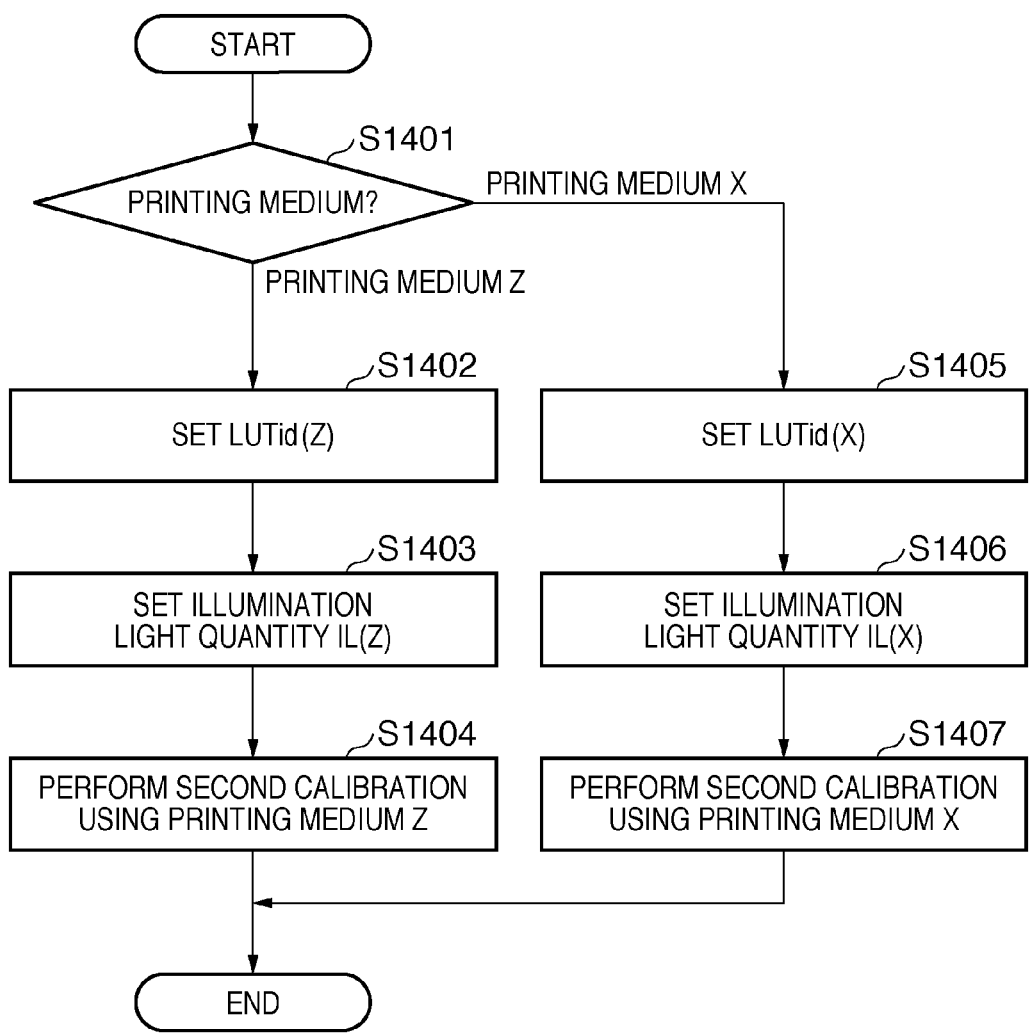

US 8,977,143 B2

IMAGE FORMING APPARATUS WHICH PERFORMS CALIBRATION FOR MAINTAINING IMAGE QUALITY

BACKGROUND OF THE INVENTION

1. Field of the Invention

The present invention relates to an image forming apparatus which performs calibration to maintain the image quality.

2. Description of the Related Art

The image quality of an image forming apparatus varies depending on its usage environment and usage condition. The image quality also varies depending on the type of printing medium to be used. It is therefore necessary to change the image conversion conditions and image forming conditions depending on the environment and usage condition (Japanese Patent Laid-Open No. 07-261479). In some cases, image conversion conditions and image forming conditions need to be added in accordance with the type of printing medium to be used (Japanese Patent Laid-Open No. 08-287217).

The invention in Japanese Patent Laid-Open No. 07-261479 assumes using a specific type of printing medium (to be referred to as the first printing medium) for calibration each time. If the first printing medium runs out, no calibration can be performed. Adding an arbitrary type of printing medium (to be referred to as the second printing medium) by applying the invention in Japanese Patent Laid-Open No. 08-287217 may provide a wide variety of printing media usable in calibration. However, even in the invention of Japanese Patent Laid-Open No. 08-287217, performing calibration for the added second printing medium requires a printing medium of the same type to be prepared each time. This is because the calibration aims to maintain the tone characteristic for the added second printing medium. If calibration is performed using the second printing medium of a type different from the first printing medium, for example, the amount of applied toner may become insufficient or exceed a permissible range designed for the image formation apparatus. This means that the image quality cannot be maintained. It would be convenient for the operator if calibration for the first printing medium could be performed using the second printing medium. For example, the use of an OHT (Overhead Transparency) sheet is designated for calibration for maintaining the tone characteristic for the OHT sheet. However, making plain paper usable for calibration to maintain the tone characteristic for the OHT sheet offers significant advantages to the operator.

The invention in Japanese Patent Laid-Open No. 08-287217 ignores the difference in the reflectance of the blank portion (background) of a printing medium depending on the type of printing medium. The reflectance of the background where no toner image is formed on the surface of a printing medium changes depending on the type of printing medium, so high-accuracy calibration cannot be achieved unless the difference in the reflectance is taken into consideration. As higher image quality is requested more and more, this difference in the reflectance should not be overlooked.

SUMMARY OF THE INVENTION

It is a feature of the present invention to solve at least one of the above problems and other problems. For example, it is a feature of the present invention to improve the calibration accuracy by correcting (adjusting) a luminance value output from an image reading apparatus in accordance with the type of printing medium used in calibration. Note that other problems will be understood throughout the specification.

The present invention provides an image forming apparatus comprising: an image forming unit configured to form a pattern image on a first printing medium; an illumination unit configured to illuminate the first printing medium bearing the pattern image; an output unit configured to output a first luminance value based on light reflected by the first printing medium illuminated by the illumination unit; and a processing unit configured to create a first image processing condition for adjusting a tone characteristic in the image forming unit based on the first luminance value in the case that calibration is performed, wherein in the case that calibration using a second printing medium different from the first printing medium is performed, the processing unit is configured to correct, based on a luminance value of a background region of the second printing medium, a second luminance value output in accordance with light reflected by the second printing medium, and to create the first image processing condition based on the corrected second luminance value.

Further features of the present invention will become apparent from the following description of exemplary embodiments (with reference to the attached drawings).

BRIEF DESCRIPTION OF THE DRAWINGS

FIG. 6 is a graph showing the relationship between the contrast potential and the image density value;

FIG. 12 is a flowchart showing a correction coefficient determination method;

FIG. 14 is a flowchart showing the second calibration using a specific or added printing medium;

DESCRIPTION OF THE EMBODIMENTS

Embodiments of the present invention will be described below. The individual embodiments will help aid the understanding of various concepts such as superordinate, intermediate, and subordinate concepts of the invention. The technical scope of the present invention is defined by the scope of the appended claims, and is not limited by the following individual embodiments.

First Embodiment

An embodiment applied to an electrophotographic color copying machine will be explained below. Note that the present invention is applicable to any image formation apparatus that needs calibration. The image formation scheme is not limited to electrophotography, and may be inkjet printing, electrostatic printing, or any other scheme. The present invention is applicable not only to an image formation apparatus for forming a multicolor image but also to an image formation apparatus for forming a single-color image. The image formation apparatus may be commercially available as, for example, a printing apparatus, printer, copying machine, multifunction peripheral, or facsimile apparatus. The printing medium is also called printing paper, printing material, paper, sheet, transfer material, or transfer paper. The printing medium can be made of paper, fiber, film, or resin.

<Basic Hardware Configuration>

Figure 1:
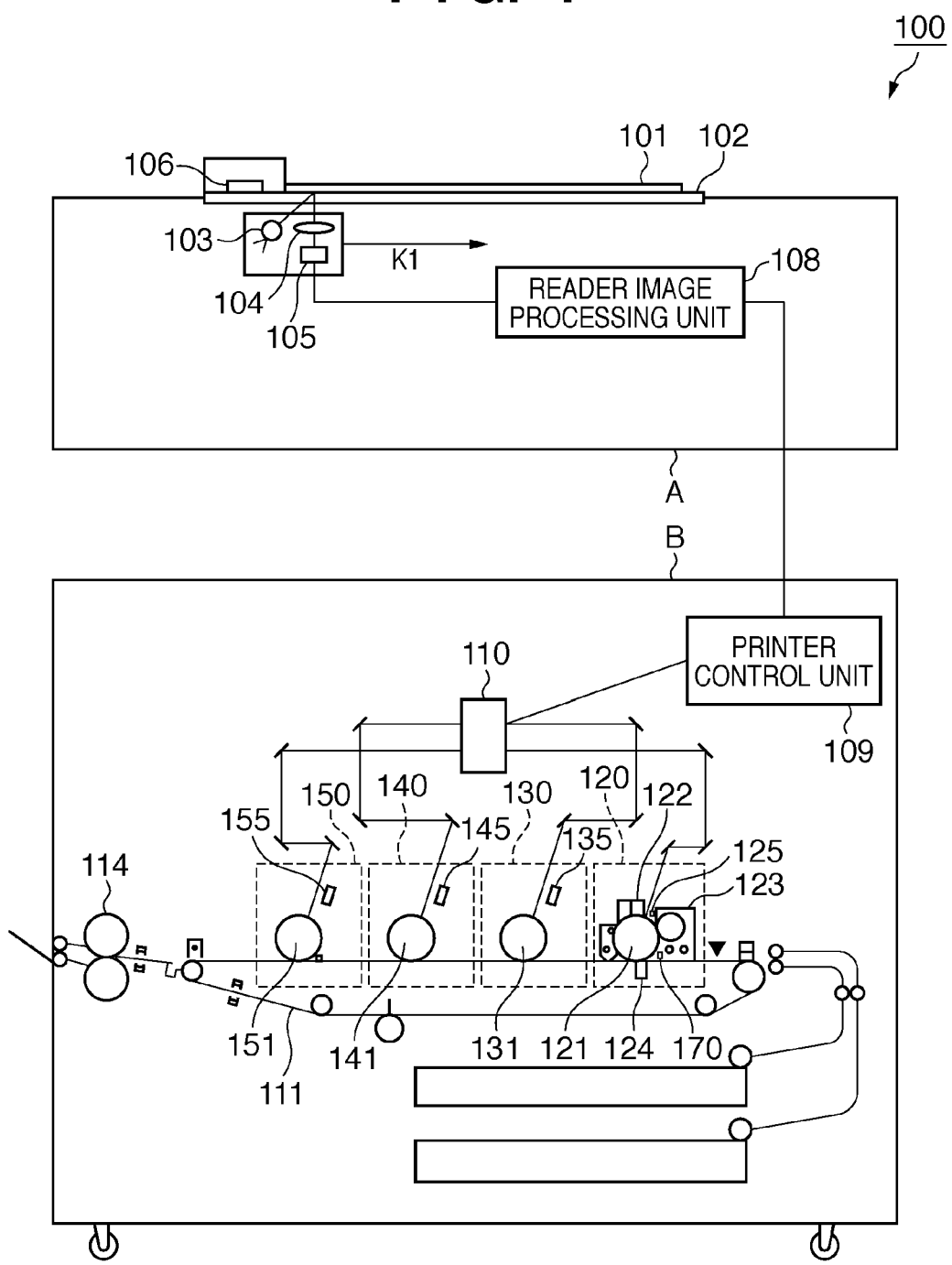
FIG. 1 is a view exemplifying the arrangement of a color copying machine.

A copying machine 100 shown in FIG. 1 includes a reader unit A which reads an image from a document, and a printer unit B which forms the image obtained by reader unit A on a printing medium. The printer unit B functions as an image forming unit for forming a pattern image on the first printing medium X. The reader unit A is an example of an image reading unit for reading the pattern image formed by the image forming unit to create image data containing a luminance value. That is, the reader unit A functions as a reading unit for reading an image fixed on a printing medium. Before reading a document 101 set on an original platen glass 102, the reader unit A reads a reference white plate 106 to create a correction coefficient to be used in subsequent shading correction. The document 101 is irradiated with light from a light source 103, and the reflected light forms an image on a CCD sensor 105 via an optical system 104. The light source 103 is an example of an illumination unit for illuminating the first printing medium X bearing a pattern image. A reading unit including the CCD sensor 105 moves in a direction indicated by an arrow K1 to convert the document into an electrical signal data string for each line. Note that not the reading unit but the document may move. A reader image processing unit 108 converts the electrical signal data string into an image signal. The CCD sensor 105 is an example of a light receiving unit for receiving light reflected by a printing medium illuminated by the light source.

Figure 2:
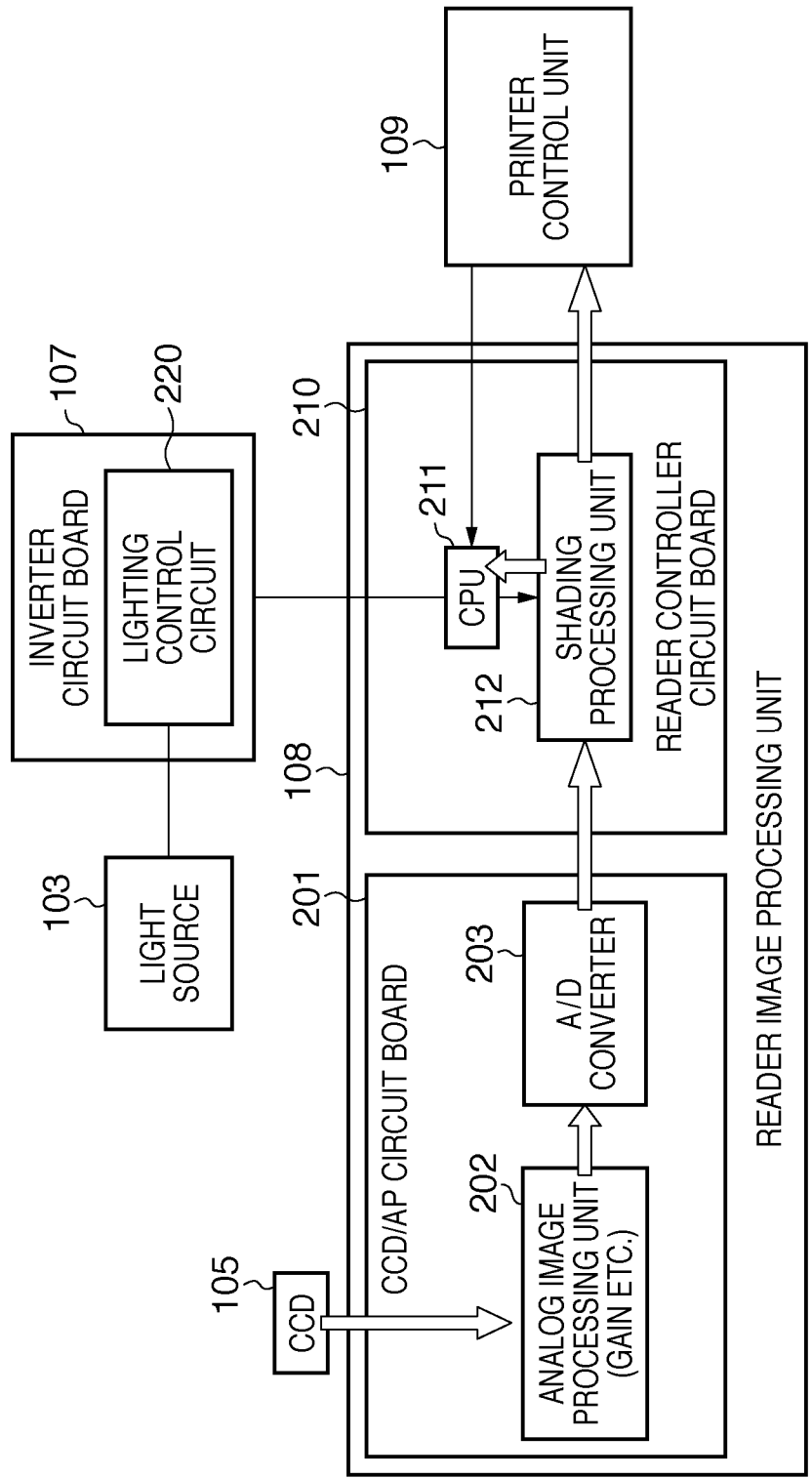
FIG. 2 is a block diagram showing a reader image processing unit.

When reading a document by the reader unit A, a CPU 211 adjusts the illumination light quantity of the light source 103 via a lighting control circuit 220 arranged on an inverter circuit board 107, as shown in FIG. 2. In the embodiments, the illumination light quantity or the gain of an amplifier circuit in an analog image processing unit 202 is adjusted in accordance with the type of printing medium to be used in calibration. The analog image processing unit 202 functions as an amplification unit for amplifying a light receiving signal output from the light receiving unit. With this arrangement, a luminance value in an image signal obtained by the CCD sensor 105 is corrected with a correction coefficient corresponding to the type of printing medium. This correction can absorb the difference of the reflectance of the background depending on the type of printing medium.

The analog image processing unit 202 of a CCD/AP circuit board 201 adjusts the gain or the like for the image signal obtained by the CCD sensor 105. An A/D converter 203 then converts the image signal into a digital image signal (luminance value), and outputs it to a controller circuit board 210 of the reader unit A. The analog image processing unit 202 includes the amplifier circuit which amplifies an image signal in accordance with a gain set by the CPU 211. A shading processing unit 212 on the controller circuit board 210 of the reader unit A performs shading correction for the image signal under the control of the CPU 211, and outputs the resultant image signal to a printer control unit 109 of the printer unit B. At this time, the image signal contains R, G, and B luminance values.

The printer unit B will be described next. Referring to FIG. 1, the printer control unit 109 converts the image signal into a laser beam having undergone PWM (Pulse Width Modulation). The laser beam is deflected and scanned by a polygon scanner 110 to expose photosensitive drums 121, 131, 141, and 151 of image forming units 120, 130, 140, and 150. As a result, electrostatic latent images are formed. The image forming units 120, 130, 140, and 150 correspond to yellow (Y), magenta (M), cyan (C), and black (Bk), respectively. The image forming units 120, 130, 140, and 150 have almost the same arrangement, and only the image forming unit 120 for yellow will be explained. A primary charger 122 charges the surface of the photosensitive drum 121 to a predetermined potential. A developing unit 123 develops the electrostatic latent image on the photosensitive drum 121 to form a toner image. A transfer blade 124 discharges the photosensitive drum 121 from the back surface of a transfer belt 111 to transfer the toner image on the photosensitive drum 121 to a printing medium on the transfer belt 111. Then, a fixing unit 114 fixes the toner image onto the printing medium.

Note that the photosensitive drums 121, 131, 141, and 151 have surface electrometers 125, 135, 145, and 155, respectively, to measure their surface potentials. The surface electrometers 125, 135, 145, and 155 are used to adjust the contrast potential.

Figure 3:
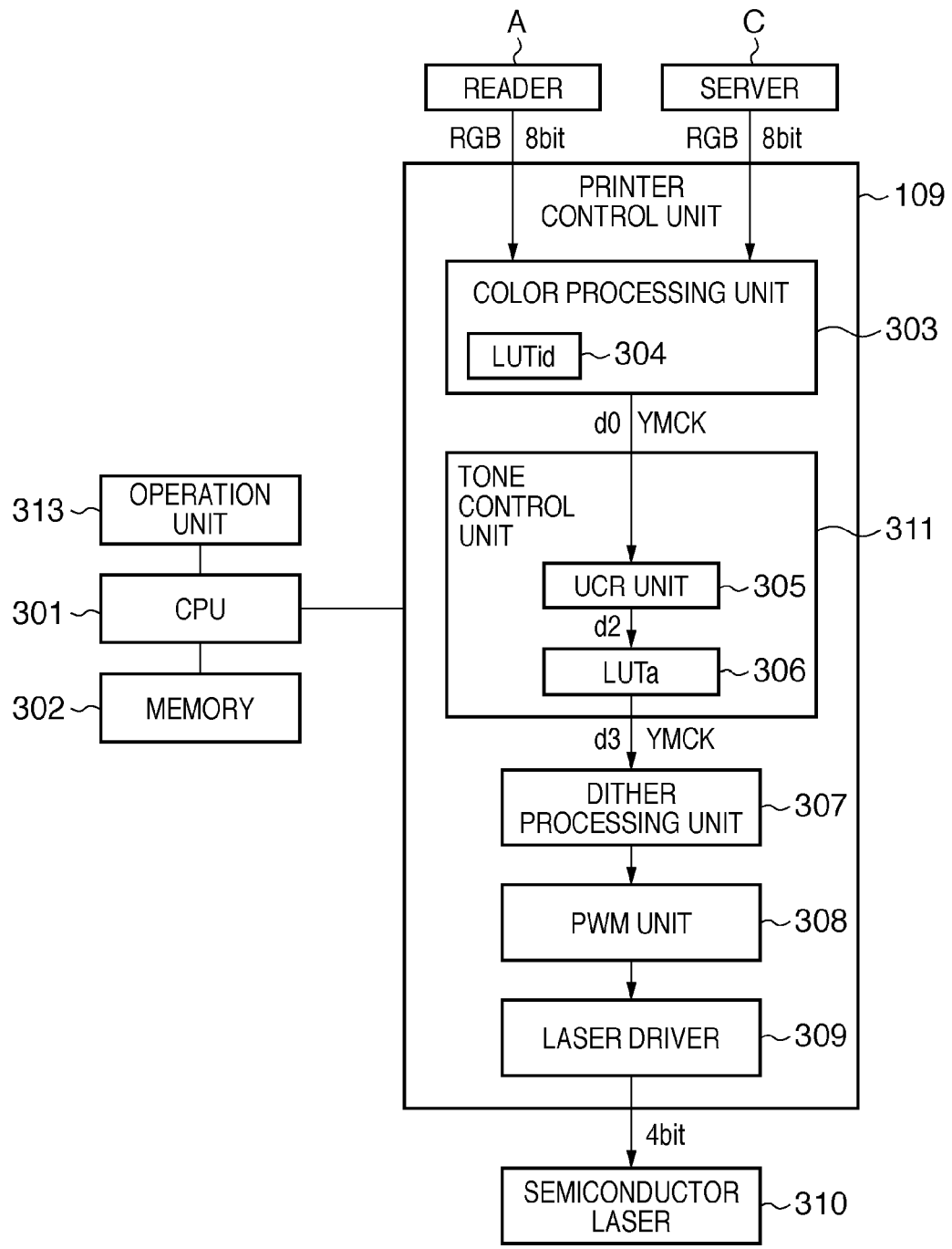
FIG. 3 is a block diagram showing a printer control unit 109.

A CPU 301 comprehensively controls the units of the printer control unit 109 shown in FIG. 3. The control unit may be formed not from the CPU 301 but from hardware such as an ASIC (Application Specific Integrated Circuit). The CPU 301 and ASIC or the like may share processes. In the following description, however, the CPU 301 performs various processes for descriptive convenience. A memory 302 includes a ROM and RAM, and stores control programs and various data. An image signal processed by the reader unit A, a print server C, or the like is input to a color processing unit 303 of the printer control unit 109. The color processing unit 303 converts a luminance value contained in image data into a density value using a luminance-density conversion table LUTid. The LUT stands for a lookup table. The LUT need not always take the table form, and may be implemented by a function or program code. The color processing unit 303 applies image processing and color processing to an input image signal to obtain a desired output when the printer unit B has an ideal output characteristic. The number of tones of the input signal is given by eight bits. For higher accuracy, the color processing unit 303 expands 8 bits to 10 bits. Each of Y, M, C, and K density values output from the color processing unit 303 will be defined as d0. After that, the image signal is sent to a dither processing unit 307 via a tone control unit 311. The dither processing unit 307 performs dither processing for the image signal to convert it into a 4-bit signal.

A LUTid 304 is prepared for a specific type of printing medium (first printing medium X) at the beginning (upon shipment from the factory). However, in the embodiment, a LUTid 304 for an arbitrary type of second printing medium Z is added by performing an operation of adding an arbitrary type of printing medium (second printing medium Z). The CPU 301 switches the LUTid 304 for each printing medium to be used. Information to designate the type of printing medium is input to the CPU 301 via, for example, an operation unit 313.

The tone control unit 311 includes a UCR unit 305 and LUTa 306, and corrects an image signal to adjust the printer unit B to ideal characteristics. The ideal characteristics are characteristics capable of achieving image quality assumed in design in advance.

The LUTa 306 is a 10-bit conversion table for correcting the density characteristic (tone characteristic) of the printer unit B, and is particularly used to change the γ characteristic of the printer unit B. The LUTa 306 is created using the first printing medium X or the like to optimize the characteristics of the printer unit B. Note that the first printing medium X is a printing medium designed in advance by the manufacturer of the image formation apparatus to obtain a desired tone characteristic. In general, the manufacturer of the image formation apparatus designates the printing medium X. The created LUTa 306 is commonly used for other printing media as well. As the LUTa 306, the latest table is always used because it is a table used to correct variations of the tone characteristic in the engine of the printer unit B depending on the installation environment or a change over time. The LUTa 306 may be created using any type of printing medium.

The UCR unit 305 is a circuit which limits the sum of image signal levels by restricting the integrated value of image signals in each pixel. If the sum exceeds a predetermined value, the UCR unit 305 performs undercolor removal processing (UCR) to replace a predetermined amount of C, M, and Y signals with a K signal, thereby decreasing the sum of image signal levels.

Assume that the upper limit value is 280%. Then, if a signal for Y=100%, M=100%, C=100%, and K=0% is input, the integrated value becomes 300%, exceeding the predetermined value. No color changes if K replaces a portion where Y, M, and C are formed by equal amounts. Thus, the UCR unit 305 decreases Y, M, and C by 10% each, and increases K by 10% instead. This results in Y=90%, M=90%, C=90%, and K=10%, and the integrated value can be maintained at 280% without changing the color. The purpose of restricting the sum of image signal levels is to restrict the amount of applied toner in image formation by the printer unit B. Optimizing the operation of the printer unit B in the embodiment is to prevent image quality degradation or the like caused by the amount of applied toner more than the predetermined amount.

In this manner, the UCR unit 305 controls a tone characteristic corresponding to the input density value d0, and outputs a density value d2. When a LUTb (FIG. 17: to be described later) operates, the LUTb converts the density value d0 into a density value d1, and the UCR unit 305 converts the density value d1 into the density value d2. The LUTa 306 controls a tone characteristic corresponding to the input density value d1, and outputs a density value d3. In a calibration step and printing medium adding step to be described later, the density value d0 is sometimes directly output as the density value d3 because the LUTa 306 and the like are controlled not to operate.

The signal output from the tone control unit 311 undergoes dither processing by the dither processing unit 307 and pulse width modulation by a PWM unit 308. A laser driver 309 causes a semiconductor laser to emit light using the PWM-modulated signal. To do this, the dither processing unit 307 performs halftone processing to convert a 10-bit image signal into 4-bit data.

<Control of Image Forming Conditions>

Calibration using the first printing medium X set in advance will be explained first. The first printing medium X is, for example, a printing medium designated by the manufacturer of the image formation apparatus upon shipment from the factory or a printing medium designated at the time of maintenance by the maintenance engineer. In the embodiment, there are the first calibration mode in which the contrast potential is adjusted, and the second calibration mode in which the γ correction circuit (LUTa 306 or a LUTb 312) of the tone control unit 311 for image data is adjusted.

I. First Calibration

Figure 4A:
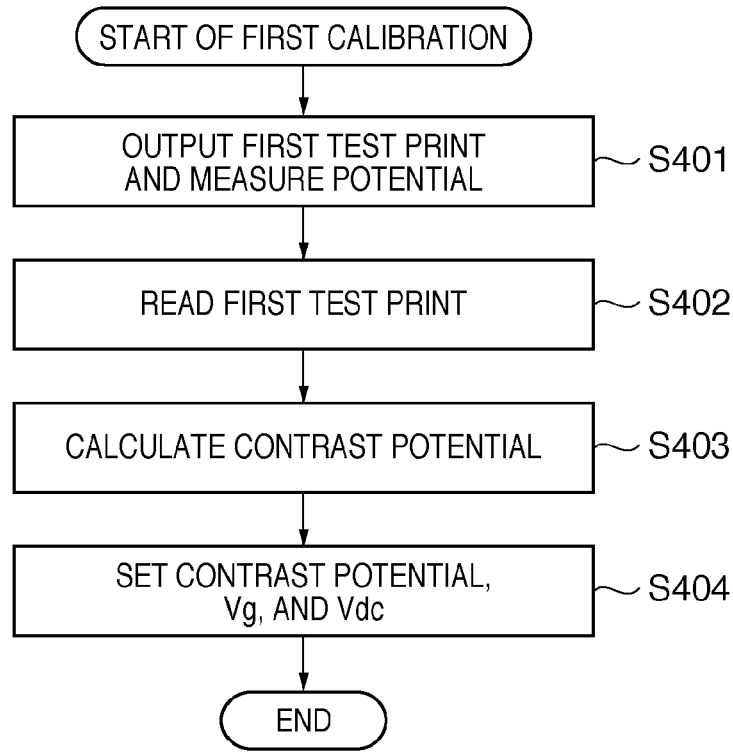
FIGS. 4A and 4B show flowchart showing contrast potential calculation processing in the first calibration and flowchart showing the second calibration, respectively.

In step S401 in FIG. 4A, the CPU 301 outputs the first test print, and measures the surface potential of the photosensitive drum. For example, the CPU 301 creates image data (YMCK density value d0 (=d1)) of the first test pattern and outputs it to the tone control unit 311, forming the first test pattern as an image on the first printing medium X. The image data may be not created by the CPU 301 but stored in the ROM of the memory 302 in advance. The first printing medium X bearing the first test pattern image serves as the first test print. As the contrast potential to be used to output the first test print, an initial value predicted to achieve the target density in the atmosphere environment (for example, absolute moisture content) at that time is set. The memory 302 is assumed to store contrast potential values corresponding to various atmosphere environments. The CPU 301 measures an absolute moisture content using a sensor (not shown), and determines a contrast potential corresponding to the measured absolute moisture content.

Figure 5A:
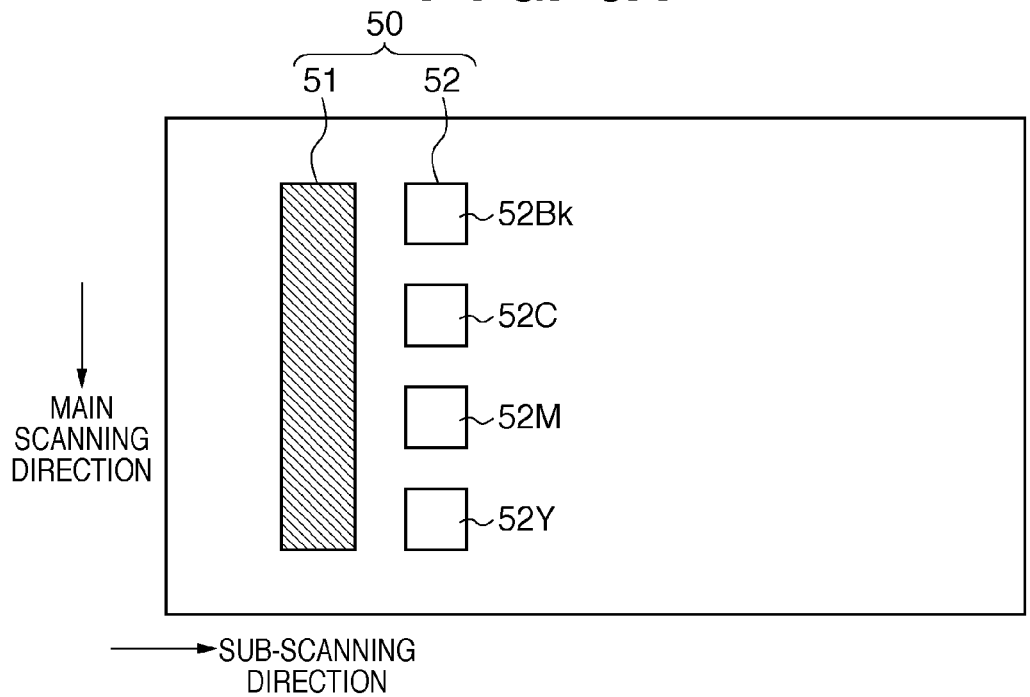
FIGS. 5A and 5B show view exemplifying the first test pattern used in the first calibration and view exemplifying the first test pattern used in the second calibration, respectively.

As shown in FIG. 5A, a first test pattern 50 is an example of the first pattern image including, for example, a stripe pattern 51 and patch pattern 52. The stripe pattern 51 is a strip-like pattern including halftone densities of Y, M, C, and Bk. The patch pattern 52 includes patch patterns 52Y, 52M, 52C, and 52Bk formed from maximum density patches (for example, 255-level density signals) for Y, M, C, and Bk. The surface electrometers 125, 135, 145, and 155 measure actual contrast potentials upon forming maximum density patches.

In step S402, the reader unit A reads the output first test print, and transfers the R, G, and B values to the CPU 301 of the printer control unit 109. The CPU 301 converts the R, G, and B values into optical densities using a LUTid(X) prepared in advance for the first printing medium X. The LUTid(X) is a luminance-density conversion table set in accordance with the relationship between the density value on the first printing medium X and the read luminance value in the reader unit A. A LUTid(Z) (to be described later) which makes the second printing medium Z usable for calibration is created by changing the LUTid(X).

In step S403, the CPU 301 calculates a contrast potential b corresponding to the target maximum density. Referring to FIG. 6, the abscissa indicates the development bias potential, and the ordinate indicates the image density. The contrast potential is the difference between the development bias potential and the surface potential of the photosensitive drum when a semiconductor laser 310 of each color emits light at the maximum level after the primary charge of the photosensitive drum. Assume that the maximum density obtained from the first test print formed using a contrast potential a is Da. In this case, the image density is linear with respect to the contrast potential near the maximum density (density of 0.8 to 2.0), as indicated by a solid line L. The solid line L is determined by the contrast potential a and maximum density Da. In the embodiment, for example, the target maximum density is set to 1.6. The CPU 301 calculates a contrast potential b corresponding to the target maximum density based on the solid line L. The memory 302 is assumed to store in advance a table or function corresponding to the solid line L. The contrast potential b is calculated using, for example, equation (1):

$$b=(a+ka)\times 1.6/Da \tag{1}$$

where ka is a correction coefficient determined by the type of developing method. In step S404, the CPU 301 determines and sets a grid potential Vg and development bias potential Vds based on the contrast potential b.

Figure 7:
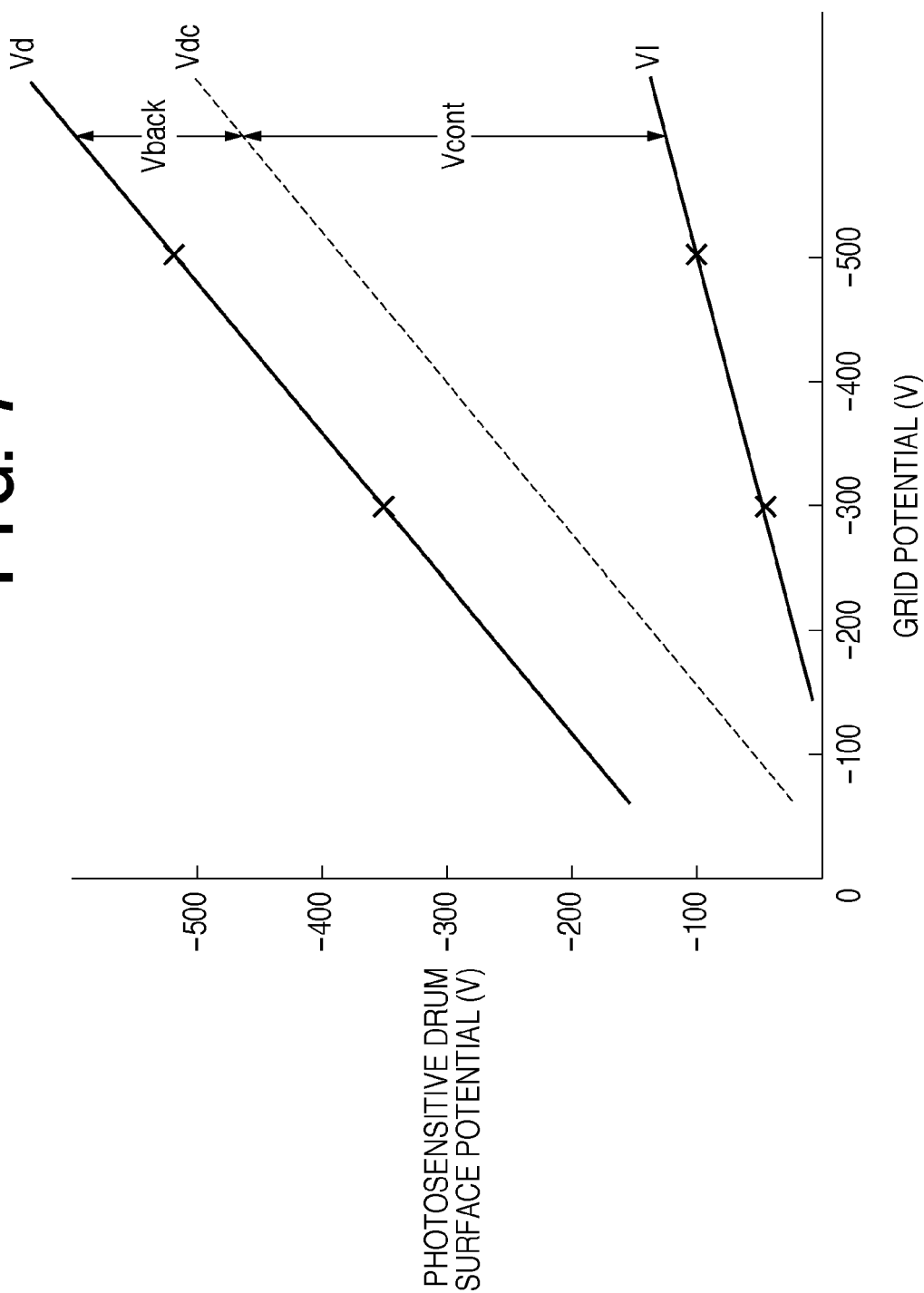
FIG. 7 is a graph showing the relationship between the grid potential Vg and the photosensitive drum surface potential.

Referring to FIG. 7, the CPU 301 sets the grid potential Vg to −300 V, performs scanning while minimizing the emission pulse level of the semiconductor laser 310 of each color, and causes each of the surface electrometers 125, 135, 145, and 155 to measure a surface potential Vd. In addition, the CPU 301 sets the grid potential Vg to −300 V, and causes each of the surface electrometers 125, 135, 145, and 155 to measure a surface potential Vl at the maximum emission pulse level of the semiconductor laser 310 for each color. Similarly, the CPU 301 sets the grid potential Vg to −700 V, and measures the surface potentials Vd and Vl. The CPU 301 can determine the relationship between the grid potential and the photosensitive drum surface potential shown in FIG. 7 by interpolating or extrapolating data at the −300 V and data at −700 V. Control to obtain potential data is called potential measurement control.

A contrast potential Vcont is determined as the difference voltage between a development bias Vdc and the surface potential Vl. A higher maximum density can be ensured for a higher contrast potential Vcont. The CPU 301 determines a grid potential Vg corresponding to the determined contrast potential b based on the relationship shown in FIG. 7. The CPU 301 determines a corresponding surface potential Vd based on the determined grid potential Vg and the relationship shown in FIG. 7. The CPU 301 also determines the development bias Vdc by subtracting Vback (for example, 150 V) from the surface potential Vd. The potential Vback is determined to prevent adhesion of fog toner to an image.

II. Second Calibration

As is well known, an image formation apparatus such as a copying machine forms a copy (output image) by reading a document image. That is, the density (tone characteristic) of a document image and the density (tone characteristic) of an output image need to match each other. In processes performed by the copying machine, the document image is converted into a luminance signal by the reader unit, and the luminance signal is converted into a corresponding density signal. The density signal is further converted into a laser output signal corresponding to the amount of applied toner. A laser beam corresponding to the laser output signal irradiates the image carrier, forming an electrostatic latent image. The electrostatic latent image is developed with toner, forming a toner image. The toner image is transferred to a printing medium, and fixed by the fixing unit, thereby forming an output image.

Figure 8:
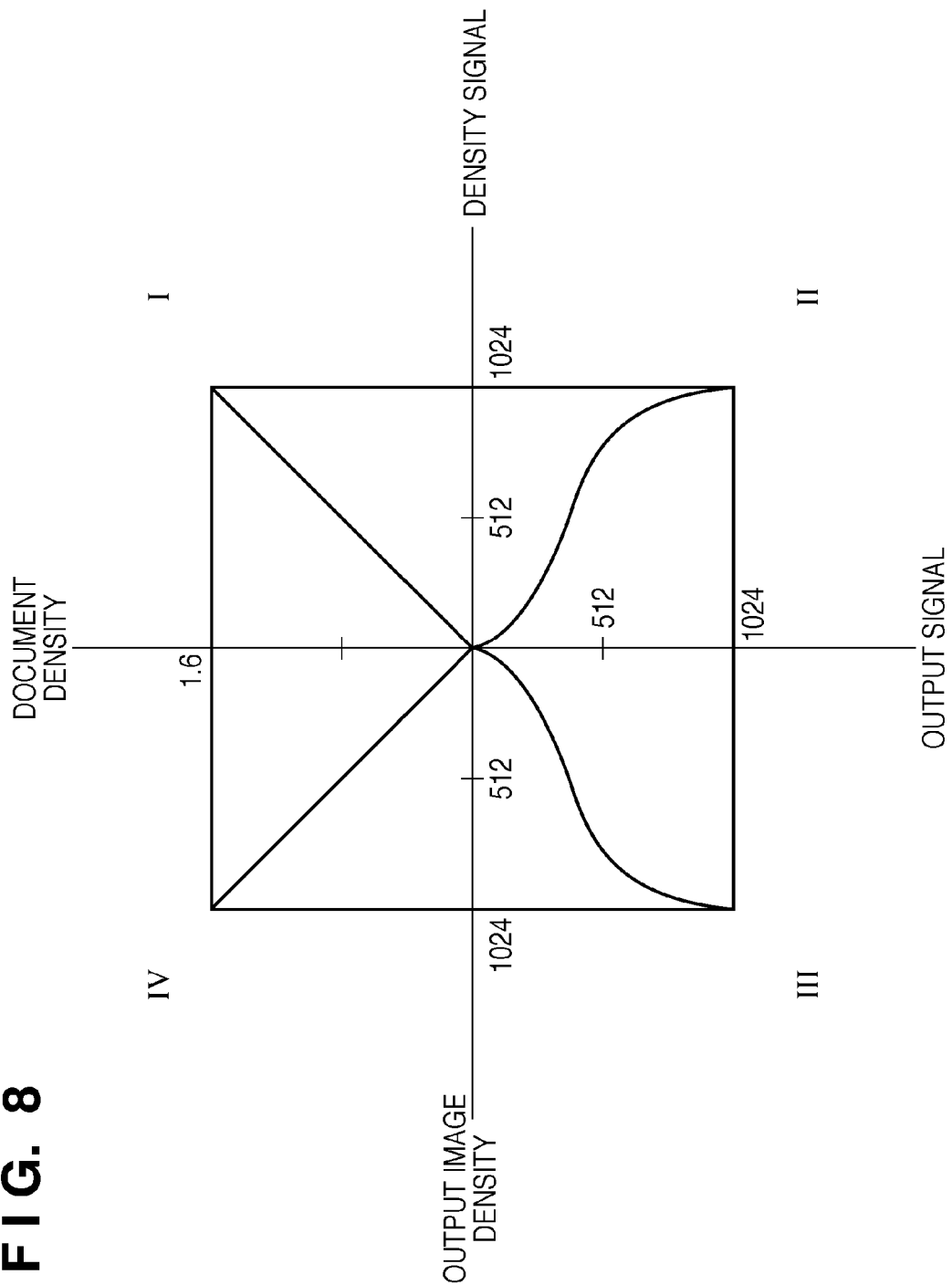
FIG. 8 is a characteristic conversion chart showing characteristics necessary to reproduce the density of a document image.

FIG. 8 shows the relationship between signals in a series of copy processes until an output image is formed from a document. The region I represents the characteristic of the reader unit A which converts a document density into a density signal. Note that the document density is expressed as an optical density obtained by reading a document using an optical densitometer. The number of tones of the density signal is 1,024. The region II represents the characteristic of the tone control unit 311 (LUTa 306) for converting a density signal into a laser output signal. The number of tones of the laser output signal is also 1,024. A LUTa(X) created in advance using the first printing medium X is set here. The region III represents the characteristic of the printer unit B which converts a laser output signal into an output density. The output image density is sometimes called a printing density. The number of tones of the output image density is 1,024. The region IV represents the relationship between the document density and the printing density. This relationship represents the whole tone characteristic of the copying machine 100 according to the embodiment.

In the copying machine 100, to obtain a linear tone characteristic in the region IV, the tone control unit 311 in the region II corrects the distortion of the printing characteristic of the printer unit B in the region III. The LUTa can be easily created by only replacing the input with the output in the characteristic in the region III obtained upon outputting a test print without operating the tone control unit 311. The pattern image on the test print includes a plurality of patches of different tones. The output signal used to form each patch is already known, as a matter of course. On the other hand, the density of each patch is read as a luminance value by the reader unit A and converted into a density signal based on the LUTid. From them, the relationship between different output signals given as inputs and density signals (density values) serving as corresponding outputs is obtained. Hence, reversing the relationship between the input and the output provides an output signal which should be output in correspondence with a density signal given as an input. That is, the LUTa indicates the relationship between the density signal and the output signal. Needless to say, the relationship between the amount of applied toner and the density signal (density value) is also known. In the embodiment, the number of tones of the output is 256 (8 bits), but that of tones in the tone control unit 311 is 1,024 because the tone control unit 311 processes a 10-bit digital signal.

Figure 4B:
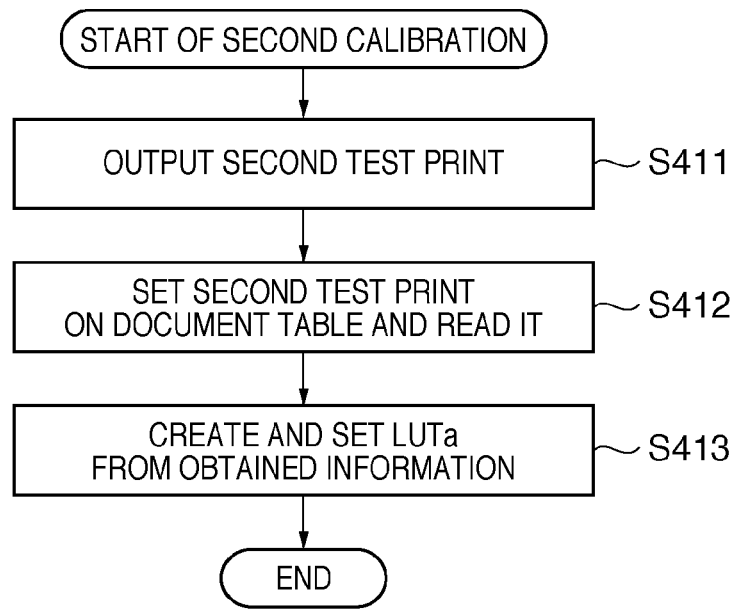

Referring to in FIG. 4B, the CPU 301 performs the second calibration. The second calibration is generally performed after the end of the first calibration.

In step S411, the CPU 301 outputs the second test print. For example, the CPU 301 creates image data (YMCK density value d0 (=d1)) of the second test pattern and outputs it to the tone control unit 311, forming the second test pattern as an image on the first printing medium X. The image data may be not created by the CPU 301 but stored in the ROM of the memory 302 in advance. The first printing medium X bearing the second test pattern image serves as the second test print. At this time, the CPU 301 performs image formation without operating the LUTa of the tone control unit 311. The density signals Y, M, C, and K output from the UCR unit 305 are input to the dither processing unit 307 while detouring around the LUTa 306.

Figure 5B:
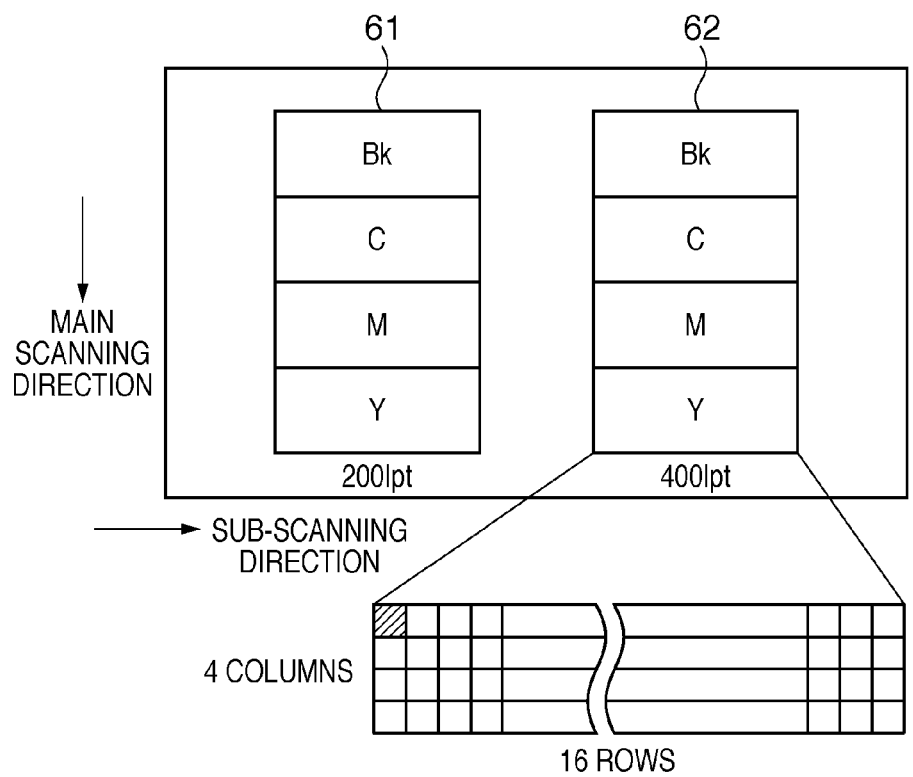

In the second test print, for example, the second test pattern (patch groups 61 and 62) having 4 columns×16 rows (that is, 64 tones) in gradation for each of Y, M, C, and Bk is formed, as shown in FIG. 5B. The second test pattern is an example of the second pattern image. For example, low-density regions out of a total of 256 tones are preferentially assigned to the 64-tone test pattern. This allows fine adjustment of the tone characteristic at a highlight portion. Note that a second test pattern for low resolution (160 to 180 lpi) and that for high resolution (250 to 300 lpi) may be prepared separately. In FIG. 5B, the former is the patch group 61, and the latter is the patch group 62. Note that lpi stands for lines/inch. To form an image of each resolution, the dither processing unit 307 performs dither processing having parameters corresponding to the resolution. Note that it suffices to create a halftone image at a resolution of about 160 to 180 lpi and a line image such as a character at a resolution of about 250 to 300 lpi. Test patterns of the same tone level are output at the two resolutions. If the tone characteristic largely changes due to the difference in resolution, the tone level may be set in accordance with the resolution. If the printer unit B has a capability of forming an image at three or more resolutions, the test print for the second calibration may be divided into a plurality of pages.

In step S412, the reader unit A reads an image from the second test pattern. R, G, and B luminance values output from the second test pattern are input to the color processing unit 303. The color processing unit 303 converts the R, G, and B luminance values into density values using the LUTid(X). The LUTid(X) is used because the first printing medium X is used.

In step S413, the CPU 301 associates each density value with a laser output level used to create the second test pattern and a test pattern (tone patch) creation position, thereby creating a table indicating the relationship between the laser output level and the density. The CPU 301 writes the created table in the memory 302. At this time, the CPU 301 can determine the characteristics of the printer unit B in the region III shown in FIG. 8. By replacing the input with the output in the characteristic, the LUTa of the printer unit B is determined and set in the tone control unit 311. In some cases, data is insufficient to determine the LUTa by calculation. This is because tone patches of only 64 tones are formed though those of 256 tones are originally required. The CPU 301 creates the necessary data by interpolating for lacking data. The second calibration can implement a linear tone characteristic with respect to the target density.

The first calibration and second calibration are performed sequentially in the embodiment, as they may only be performed individually. In the embodiment, calibration can be performed to effectively correct variations of the image density, image reproducibility, or tone reproducibility that may occur in a short or long term. The image quality can therefore be maintained.

<Operation of Adding Arbitrary Type of Printing Medium (Second Printing Medium)>

Next, processing of adding the second printing medium Z so that the first calibration and second calibration can be performed using the second printing medium Z different from the first printing medium will be described. A feature of the embodiment is to optimize the printer characteristics by performing calibration using the second printing medium Z.

Note that a correction coefficient for correcting a luminance value and a LUTid(Z) are used in the case that the second printing medium Z is used for calibration. Assume that a luminance value output from the printer unit B is corrected by adjusting the illumination light quantity of the light source 103. As will be described later, the luminance value can also be corrected by adjusting the gain of the amplifier circuit.

The reason the correction coefficient of the illumination light quantity is determined for the second printing medium Z to be added will be explained. If a light quantity optimized for the first printing medium X designated in advance is used for the second printing medium Z, the read signal of the reader unit A may be saturated or the resolution may decrease. In this case, a reading accuracy necessary for calibration may not be obtained. It is therefore important to suppress a decrease in calibration accuracy even if the reflectance of the background changes depending on the type of printing medium.

Figure 9:
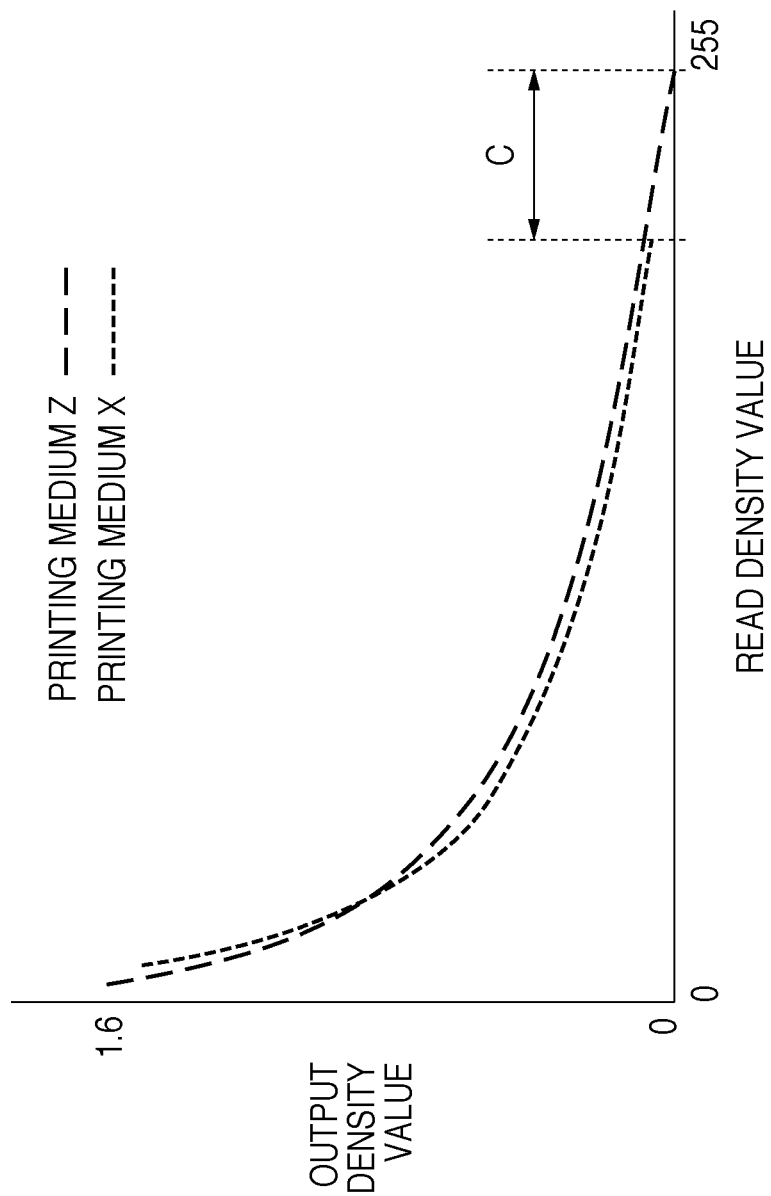
FIG. 9 is a graph exemplifying the relationship between the output density and the read luminance value for each of two printing media X and Z different in reflection characteristic.

FIG. 9 is a graph exemplifying the relationship between the output density and the read luminance value for each of the two printing media X and Z different in reflection characteristic. The second printing medium Z is higher in brightness than the first printing medium X. The second printing medium Z thus has a lower density at the blank portion. Referring to FIG. 9, the illumination light quantity of the light source 103 is set so that the luminance value at the blank portion of the second printing medium Z becomes a maximum of 255 levels. In this case, the luminance value of the blank portion of the second printing medium Z is larger by c than that of the blank portion of the first printing medium X. In contrast, the luminance difference between the printing media X and Z is very small near the maximum density level. Thus, the reading dynamic range becomes smaller by c for the first printing medium X than for the second printing medium Z. The resolution of the luminance value decreases, resulting in poor reading accuracy. If the luminance value of the blank portion of the first printing medium X is set to 255, the read signal value is saturated in a low-density region on the second printing medium Z. For this reason, the illumination light quantity or gain needs to be corrected using a correction coefficient corresponding to each type of printing medium.

To determine the LUTid(Z), the correspondence between the luminance value and the output signal is determined by reading the second test pattern on the second printing medium Z illuminated with a corrected illumination light quantity. Further, the luminance value difference between the printing media X and Z is determined. The LUTid(X) is corrected by this difference, determining the LUTid(Z). The difference in luminance value (density value) is that in luminance value (density value) designed to equalize the amounts of applied toner when identical tone patterns are formed on the printing media X and Z and read. To achieve equal densities, the amount of applied toner on the second printing medium Z needs to be increased or decreased with respect to the amount of applied toner on the first printing medium X.

Using the second printing medium for calibration which assumes using the first printing medium causes a problem in the corrected printer output characteristic. For the first printing medium, the amount of applied toner is known, and calibration is designed not to generate defects in an image. By performing calibration using the first printing medium, the tone characteristic can be adjusted to a desired characteristic. However, for the second printing medium, the relationship between the density and the amount of applied toner is unknown. If another printing medium is used in calibration which assumes using the first printing medium, the amount of applied toner may exceed an amount assumed in the design. In this case, problems may arise in transfer or fixing, resulting in image quality degradation.

Figure 10:
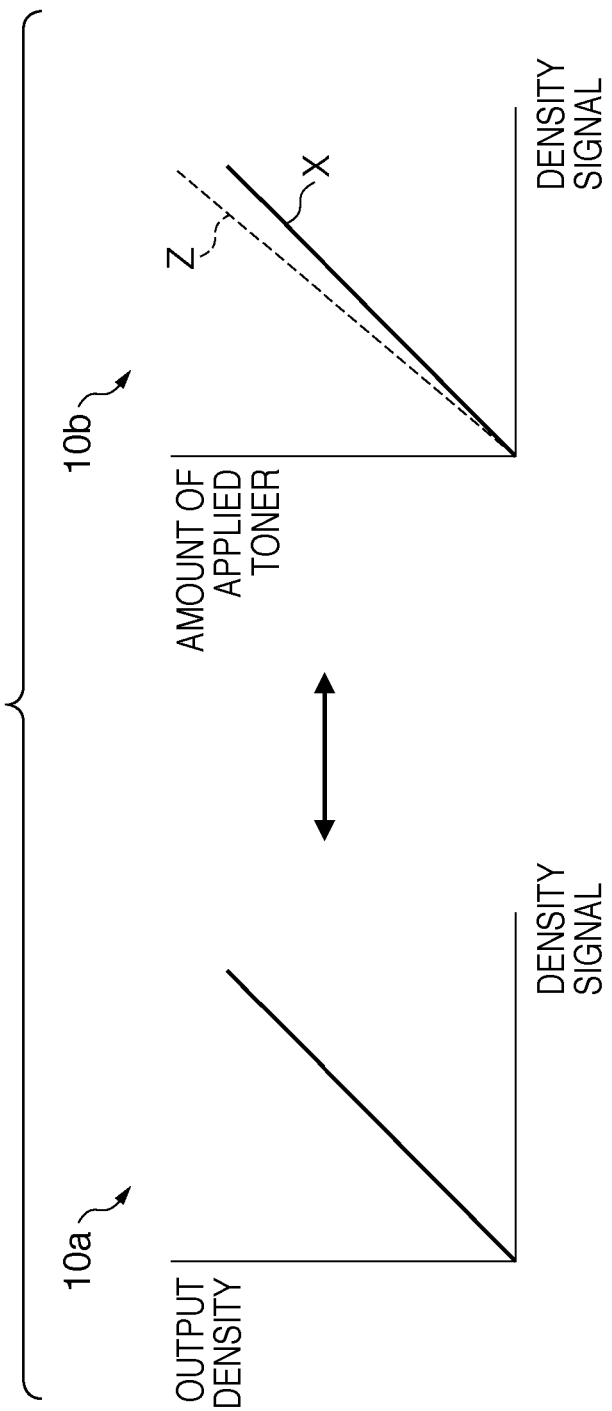
FIG. 10 shows graphs 10a and 10b for explaining the characteristic difference between printing media.

Graphs 10a and 10b of FIG. 10 exemplify the second printing medium Z whose output density lowers at the same amount of applied toner as that of the first printing medium X. Assume that the image forming conditions are set so that both the first printing medium X and second printing medium Z exhibit an output density characteristic shown in graph 10a of FIG. 10 for a certain primary color. Graph 10b in FIG. 10 shows the amount of applied toner on each printing medium with respect to the density signal. That is, the amount of applied toner on the second printing medium Z is larger than that on the first printing medium X. When a secondary color, tertiary color, and the like are output in this state, toner in an amount more than assumed exists on the second printing medium Z, generating a fixing error.

In the embodiment, the sum of signal levels of image signals is restricted immediately before the LUTa to relax (restrict) the excess amount of applied toner. To implement this, identical pattern images (image patterns) are formed on the first printing medium X and second printing medium Z using the same image signal. The same image signal is used to equalize the amounts of applied toner on the first printing medium X and second printing medium Z. The reader unit A reads images from the first printing medium X and second printing medium Z, and determines their luminance values. The CPU 301 calculates the luminance difference between the luminance values, and corrects the difference using the LUTid. For example, the CPU 301 adds the difference to the LUTid(X) for the first printing medium X, creating the LUTid (Z) for the second printing medium Z. When performing calibration using the second printing medium Z, the LUTid (Z) is set in the color processing unit to create a LUTa which implements the same tonality as that obtained by performing calibration using the first printing medium X. The color processing unit functions as a conversion unit for converting the first luminance value I(X) into the first density value using the first table LUTid(X), and converting the second luminance value I(Z) into the second density value using the second table LUTid(Z). The CPU 301 creates the first image processing condition LUTa based on the first density value when performing calibration using the first printing medium X, and creates it based on the second density value when performing calibration using the second printing medium Z.

Figure 11:
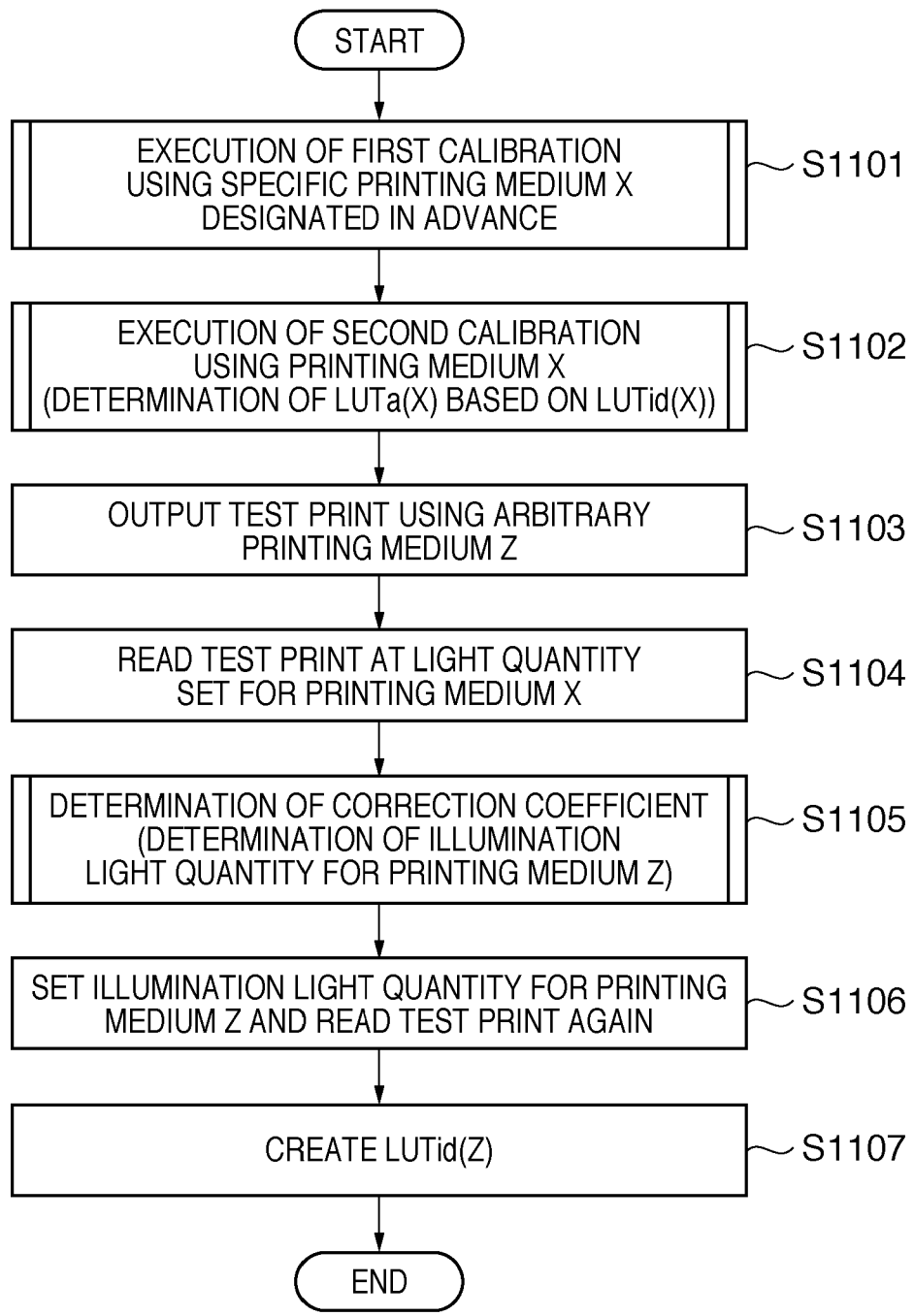
FIG. 11 is a flowchart showing a printing medium adding operation.

FIG. 11 is a flowchart showing a printing medium adding operation. When the user designates addition of a printing medium for calibration by pressing a button of the operation unit 313 on the copying machine 100, the CPU 301 activates the adding operation. At this point of time, the LUTid(X) has been set in the color processing unit 303.

In step S1101, the CPU 301 performs the aforementioned first calibration (steps S401 to S404) using the first printing medium X designated in advance. In step S1102, the CPU 301 performs the second calibration (steps S411 to S413) using the first printing medium X. That is, the first calibration and second calibration are performed sequentially. A LUTa is thus created. The LUTa is set in the tone control unit 311, and the tone characteristic of the image forming unit is adjusted to a desired characteristic using the first printing medium X.

The processing in step S1102 will be explained in detail. The CPU 301 controls the printer control unit 109 to form the second test pattern on the first printing medium X. For example, the CPU 301 creates the second test pattern and outputs it to the tone control unit 311. The printer unit B forms the second test pattern as an image on the first printing medium X. This serves as the second test print. Note that the second test pattern itself is identical between the first printing medium X and the second printing medium Z. The printer unit B discharges the first printing medium X bearing the second test pattern.

Then, the CPU 211 of the reader unit A sets an illumination light quantity for the first printing medium X in the lighting control circuit 220, turns on the light source 103, and controls the CCD sensor 105 to read the test print of the first printing medium X. The CPU 211 transfers, to the CPU 301, an image signal containing a luminance value created by reading the test print. The luminance value obtained from the first printing medium X will be called I(X). The CPU 211 functions as an output unit for outputting the first luminance value I(X) based on light reflected by the first printing medium X illuminated by the illumination unit. In this way, the reader unit A reads an image pattern formed on the first printing medium X, generates the read luminance value I(X), and transfers it to the CPU 301 of the printer control unit 109. The CPU 301 converts the luminance value I(X) into a density value d(X) using the LUTid(X), and determines a LUTa(X) for correcting the tone characteristic based on the density value d(X). The CPU 301 functions as a creation unit for creating the first image processing condition LUTa for adjusting the tone characteristic in the image forming unit based on the first luminance value I(X) when performing calibration. The CPU 301 sets the LUTa(X) in the tone control unit 311, and saves the luminance value I(X) in the memory 302.

In step S1103, the CPU 301 controls the printer control unit 109 to form the second test pattern on the second printing medium Z to be added. The printer unit B discharges the second printing medium Z bearing the second test pattern.

In step S1104, the CPU 211 of the reader unit A sets an illumination light quantity for the first printing medium X in the lighting control circuit 220, turns on the light source 103, and controls the CCD sensor 105 to read the test print of the second printing medium Z. The CPU 211 transfers, to the CPU 301, an image signal containing a luminance value created by reading the test print. The luminance value obtained from the second printing medium Z will be called I(Z).

In step S1105, the CPU 301 determines a correction coefficient C(Z) for correcting the luminance value I(Z) based on the image signal received from the CPU 211. Details of the processing of determining the correction coefficient C(Z) will be described with reference to FIG. 12.

In step S1106, the CPU 301 sets, for the CPU 211, an illumination light quantity determined based on the correction coefficient C(Z). The CPU 211 sets this illumination light quantity in the lighting control circuit 220, turns on the light source 103, and controls the CCD sensor 105 to read the test print. The CPU 211 transfers, to the CPU 301, an image signal containing a luminance value I'(Z) created by reading the test print. The CPU 301 saves the luminance value I'(Z) in the memory 302.

In step S1107, the CPU 301 adds the difference between the luminance values I(X) and I'(Z) to the LUTid(X), creating a LUTid(Z). That is, the second table LUTid(Z) is calculated by adding the difference between the first luminance value I(X) and the corrected second luminance value I'(Z) to the first table LUTid(X). The CPU 301 saves the LUTid(Z) in the memory 302 in association with identification information indicating the type of second printing medium Z. The CPU 301 reads out, from the memory 302, the LUTid(Z) corresponding to the type of printing medium designated via the operation unit 313, and sets it in the color processing unit 303. In this fashion, the LUTid(Z) is created by correcting the LUTid(X) based on the luminance value I'(Z).

<Correction Coefficient Determination Method>

FIG. 12 is a flowchart exemplifying a correction coefficient determination method. In step S1201, the CPU 301 detects the luminance value Bwi of the background region where no toner image is formed on the test pattern on the second printing medium Z that has been read at an illumination light quantity for the first printing medium X. The luminance value is expressed by, for example, 255 levels. In step S1202, the CPU 301 determines the correction coefficient C(Z) for correcting the illumination light quantity based on the luminance value Bwi of the background region. For example, the correction coefficient C(Z) may be determined using the following equation:

$$C(Z) = BX/Bwi$$

where BX is a coefficient, such as 200, empirically determined upon shipment from the factory based on a luminance value obtained from the background of the first printing medium X. The value "200" is equivalent to a luminance value obtained when the background of the first printing medium X is read at the illumination light quantity for the first printing medium X. This value may contain a margin considering variations generated in every calibration.

In step S1203, the CPU 301 determines an illumination light quantity IL(Z) for the second printing medium Z using the correction coefficient C(Z). For example, the illumination light quantity IL(Z) may be determined using the following equation:

$$\text{light quantity } IL(Z) = C(Z) \cdot IL(X)$$

where IL(X) is an illumination light quantity for the first printing medium X, which is a value determined upon shipment from the factory. As described above, correcting the illumination light quantity provides a corrected luminance value.

In step S1204, the CPU 301 sets the illumination light quantity IL(Z) in the lighting control circuit 220 via the CPU 211. As is apparent from FIG. 12 and the above equations, the CPU 301 determines a correction coefficient for the second printing medium so that a luminance value obtained upon receiving light reflected by the background of the first printing medium designated in advance as a printing medium to be used to perform calibration coincides with a luminance value obtained upon receiving light reflected by the background of the second printing medium which is different in type from the first printing medium and is newly added as a printing medium to be used to perform calibration. Accordingly, the difference of the background reflectance depending on the type of printing medium affects the calibration accuracy less.

<LUTid Determination Method>

Figure 13:
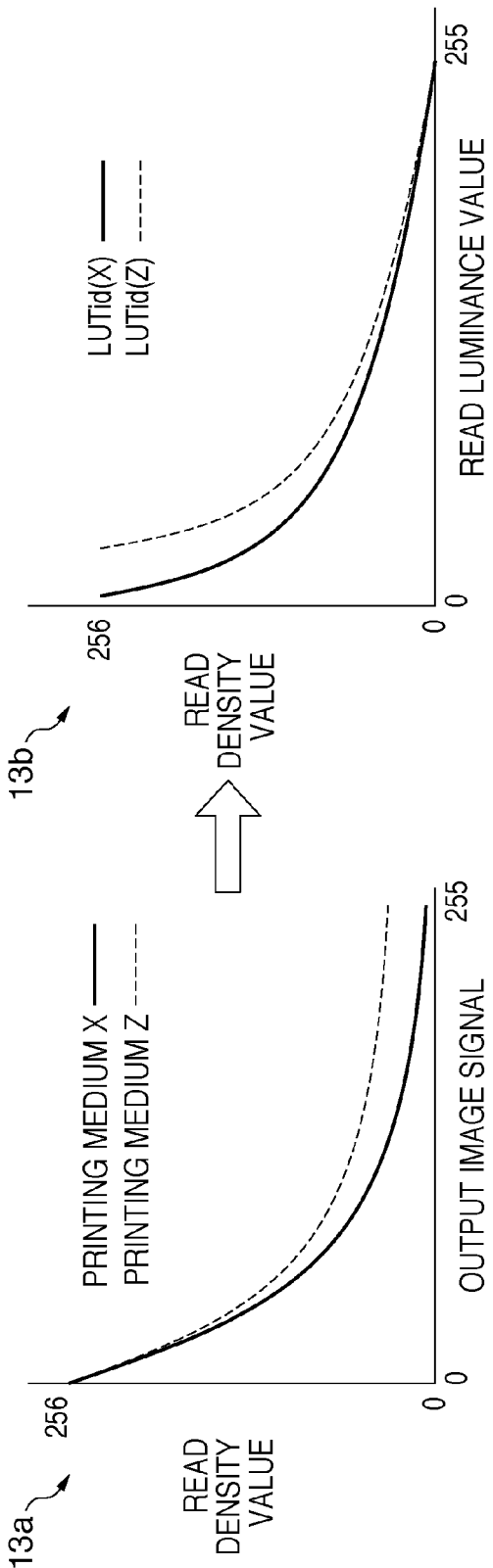
FIG. 13 shows graphs 13a and 13b showing the relationship between the output image signal and the read luminance value for each of the first printing medium X and second printing medium Z and the relationship between the read luminance value and the read density value, respectively.

Referring to FIG. 13, graph 13a in FIG. 13 shows the relationship between the output image signal and the read luminance value for each of the first printing medium X and second printing medium Z. Graph 13b in FIG. 13 shows the relationship between the read luminance value and the read density value. Note that the density value on the second printing medium Z is converted into that on the first printing medium X.

The read luminance value I(X) for the first printing medium X and the read luminance value I'(Z) for the second printing medium Z are luminance values read from images formed on the first printing medium X and second printing medium Z using the same image signal (=the same amount of applied toner). Based on the luminance values I(X) and I'(Z), the CPU 301 calculates the luminance difference between the first printing medium X and the second printing medium Z necessary to achieve the same amount of applied toner. The CPU 301 adds the luminance difference to the LUTid(X), creating a LUTid(Z) for the second printing medium Z.

Thereafter, calibration is activated when the environment changes, a predetermined number of images or more are formed, or the operator designates execution of calibration via the operation unit. It is generally estimated that the tone characteristic in the image forming unit has varied when such an event occurs. The CPU 301 activates calibration at the timing when it is estimated that the tone characteristic in the image forming unit has varied. Processing in this case will be explained with reference to FIG. 14. The use of the LUTid(Z) enables performing both the first calibration and second calibration using the second printing medium Z. This calibration result matches one obtained from the first printing medium.

In step S1401, the CPU 301 accepts, via the operation unit 313, designation of a type of printing medium to be used for calibration, and determines the designated type of printing medium. If the second printing medium Z is designated, the process advances to step S1402. In step S1402, the CPU 301 reads out, from the memory 302, a LUTid(Z) corresponding to the designated second printing medium Z, and sets it in the color processing unit 303. In step S1403, the CPU 301 reads out, from the memory 302, the illumination light quantity IL(Z) corresponding to the designated second printing medium Z, and sets it in the lighting control circuit 220. In step S1404, the CPU 301 performs the first calibration (steps S401 to S404) and the second calibration (steps S411 to S413). In this manner, the CPU 301 functions as a creation unit for correcting, based on the luminance value of the background region of the second printing medium Z, the second luminance value I(Z) output in accordance with light reflected by the second printing medium Z, and creating the first image processing condition LUTa based on the corrected second luminance value I'(Z) when performing calibration using the second printing medium Z different from the first printing medium X.

If the first printing medium X is designated, the process advances to step S1405. The CPU 301 reads out, from the memory 302, the LUTid(X) corresponding to the designated first printing medium X, and sets it in the color processing unit 303. In step S1406, the CPU 301 reads out, from the memory 302, the illumination light quantity IL(X) corresponding to the designated first printing medium X, and sets it in the lighting control circuit 220. In step S1407, the CPU 301 performs the first calibration (steps S401 to S404) and the second calibration (steps S411 to S413). Particularly, the second calibration updates the LUTa(X). Note that the representations "LUTa(X)" and "LUTa(Z)" are adopted for respective types of printing media. However, the created LUTa is not changed in accordance with the type of printing medium. This is because the LUTa is a table for adjusting the tone characteristic in the engine of the printer unit B. As a matter of course, the LUTa(X) and LUTa(Z) are identical tables for the same tone characteristic of the printer unit B.

<Luminance Value Correction by Gain Adjustment>

In the flowcharts shown in FIGS. 11 and 12, the luminance value is corrected by adjusting the illumination light quantity in accordance with the type of printing medium. However, the luminance value may be corrected by another method. For example, a luminance value output from the A/D converter 203 can also be corrected by adjusting the gain of the amplifier circuit of the analog image processing unit 202.

Figure 15:
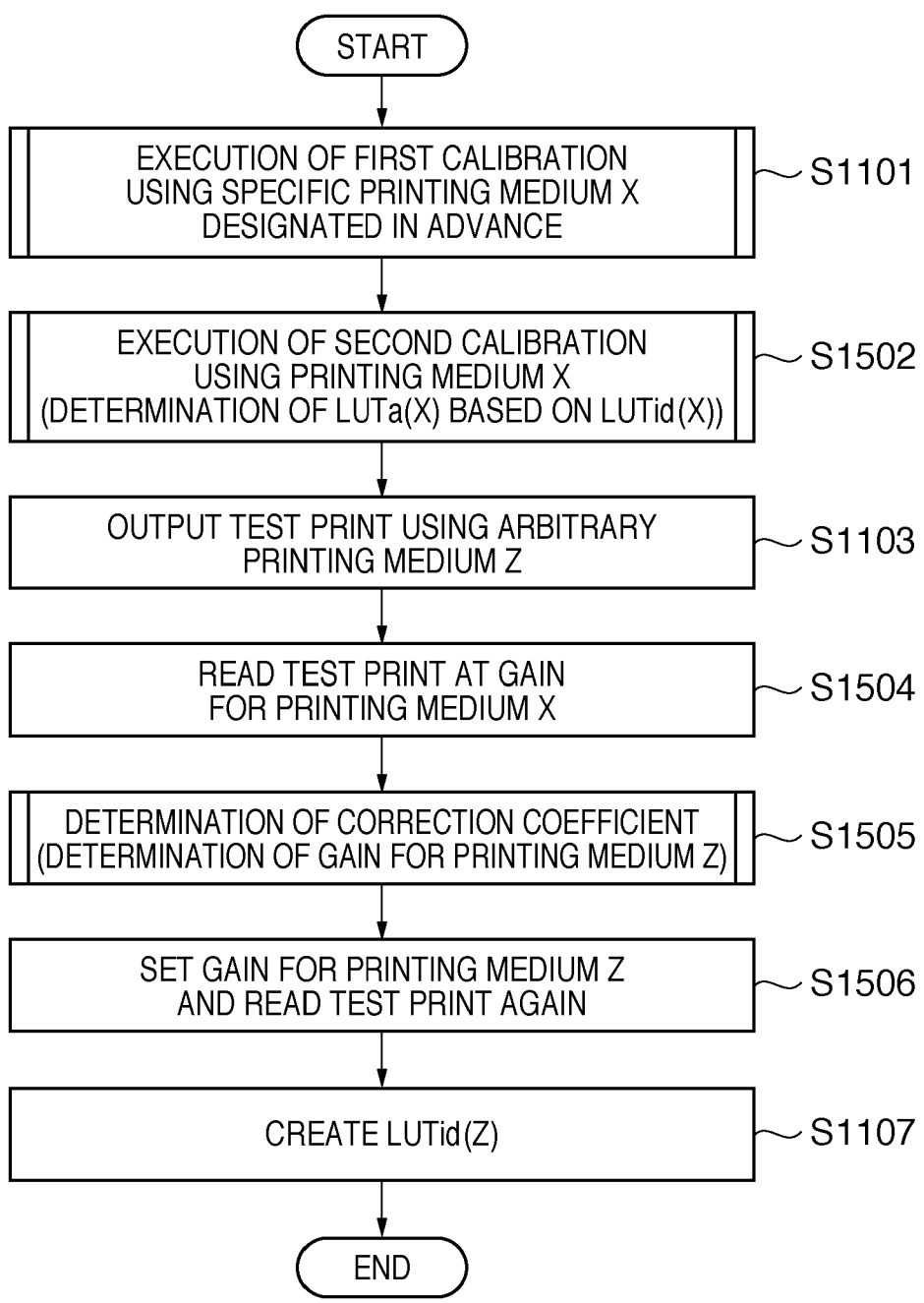
FIG. 15 is a flowchart showing a printing medium adding operation.

FIG. 15 is a view exemplifying a printing medium adding operation. The same reference numerals as those in FIG. 11 denote the same processes, and a description thereof will not be repeated. FIG. 15 is different from FIG. 11 in that steps S1502 and S1504 to S1506 replace steps S1102 and S1104 to S1106.

In step S1502, the CPU 211 of the reader unit A sets a gain for the first printing medium X in the analog image processing unit 202, and controls the CCD sensor 105 to read the test print of the first printing medium X. Note that the value of the illumination light quantity is constant regardless of the type of printing medium. The CPU 211 transfers, to the CPU 301, an image signal containing a luminance value created by reading the test print. Note that the amplifier circuit of the analog image processing unit 202 amplifies the image signal by the set gain, and sends it to the A/D converter 203. The luminance value I(X) is thus obtained.

In step S1504, the CPU 211 of the reader unit A sets a gain for the first printing medium X in the analog image processing unit 202, and controls the CCD sensor 105 to read the test print of the second printing medium Z. Note that the value of the illumination light quantity is constant regardless of the type of printing medium. The CPU 211 transfers, to the CPU 301, an image signal containing a luminance value created by reading the test print. Note that the amplifier circuit of the analog image processing unit 202 amplifies the image signal by the set gain, and sends it to the A/D converter 203. As a result, the luminance value I(Z) is obtained.

In step S1505, the CPU 301 determines a correction coefficient for correcting the luminance value based on the image signal received from the CPU 211. Details of the correction coefficient determination processing will be described with reference to FIG. 16.

In step S1506, the CPU 301 sets, for the CPU 211, a gain determined based on the correction coefficient. The CPU 211 sets this gain in the analog image processing unit 202, and controls the CCD sensor 105 to read the test print. The CPU 211 transfers, to the CPU 301, an image signal containing a luminance value I'(Z) created by reading the test print. The CPU 301 saves the luminance value I'(Z) in the memory 302.

<Correction Coefficient Determination Method>

Figure 16:
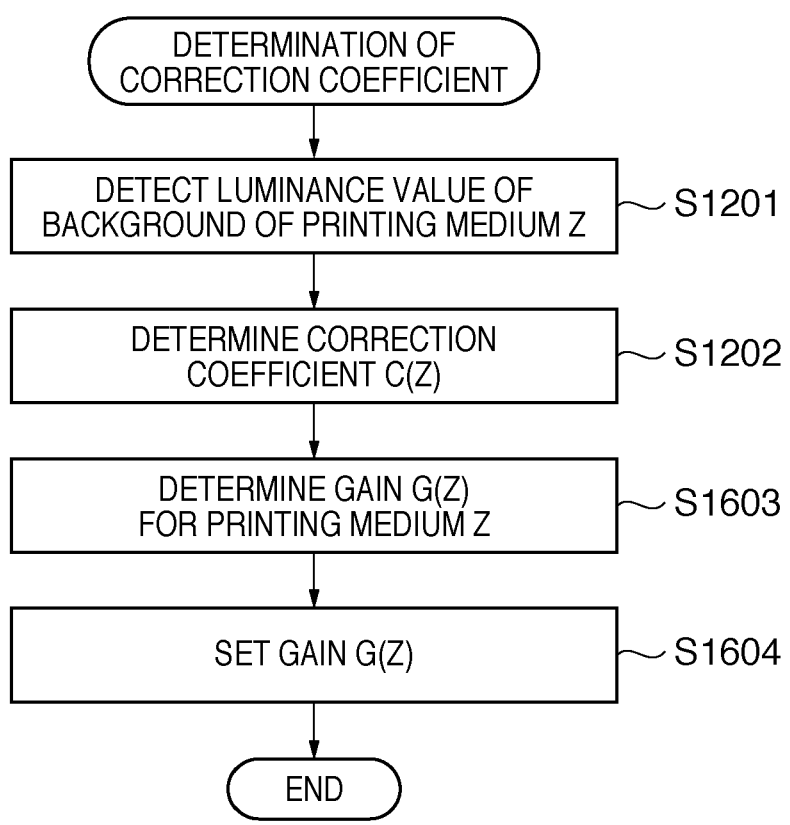
FIG. 16 is a flowchart showing a correction coefficient determination method.

FIG. 16 is a flowchart exemplifying a correction coefficient determination method. FIGS. 16 and 12 are common in step S1201, and a description thereof will not be repeated. In step S1202, the CPU 301 determines the correction coefficient C(Z) for correcting the illumination light quantity based on the luminance value Bwi of the background region. For example, the correction coefficient C(Z) may be determined using the following equation:

$$C(Z)=BX/Bwi$$

where BX is a coefficient, such as 200, empirically determined upon shipment from the factory based on a luminance value obtained from the background of the first printing medium X. The value "200" is equivalent to a luminance value obtained when the background is read at the illumination light quantity for the first printing medium X. This value may contain a margin considering variations generated in every calibration.

In step S1603, the CPU 301 determines a gain G(Z) for the second printing medium Z using the correction coefficient C(Z). For example, the gain G(Z) may be determined using the following equation:

$$\text{gain } G(Z)=C(Z)\cdot G(X)$$

where G(X) is a gain for the first printing medium X, which is a value determined upon shipment from the factory.

In step S1604, the CPU 301 sets the gain G(Z) in the analog image processing unit 202 via the CPU 211. In this fashion, the CPU 301 functions as a correction unit for correcting the gain of the amplification unit using the correction coefficient.

In subsequent calibration, a gain corresponding to the type of printing medium is set instead of setting an illumination light quantity corresponding to the type of printing medium in steps S1403 and S1406 of FIG. 14. Assume that the gain value is stored in the memory 302 in association with identification information indicating the type of printing medium.

<Others>

In the above-described embodiment, either the illumination light quantity or gain is corrected based on the correction coefficient. However, both the illumination light quantity and gain may be corrected. In this case, the correction ratio of the illumination light quantity and gain may be weighted. In a reading apparatus in which the influence of the illumination light quantity on the luminance value is dominant over the gain, the weight on the correction coefficient is set large for the illumination light quantity and small for the gain. Also, another parameter capable of absorbing the difference of the reflectance of the printing medium may be corrected instead of or in addition to the illumination light quantity and gain.

Figure 17:
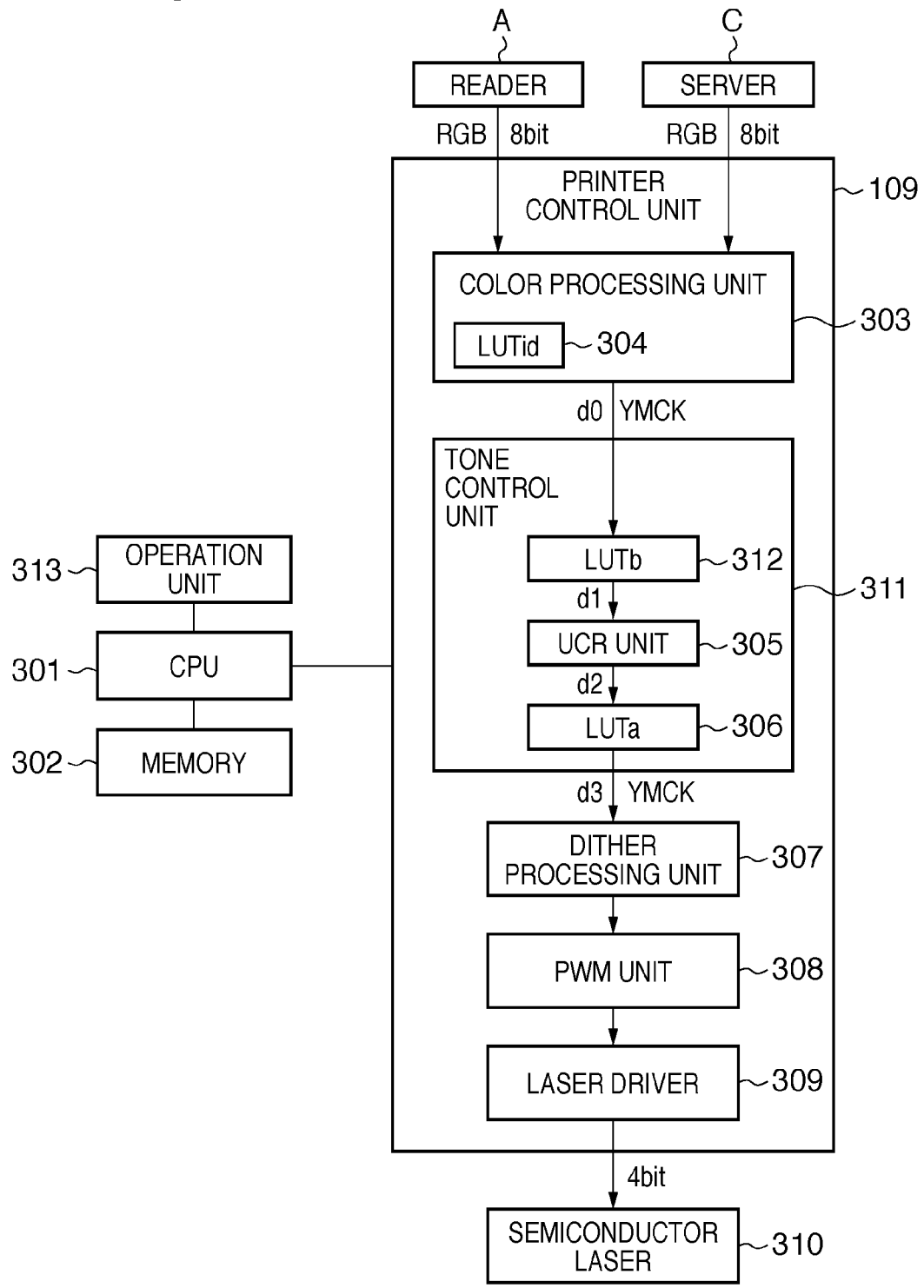
FIG. 17 is a block diagram showing a printer control unit 109.

The above-described embodiment is applicable even to a modification of the arrangement of the tone control unit 311, as shown in FIG. 17. Referring to FIG. 17, a LUTb 312 is added on the preceding stage of the UCR unit 305. The LUTb 312 is a lookup table functioning to correct the tone characteristic dependent on the type of printing medium. The above-mentioned LUTa 306 is a lookup table for correcting the tone characteristic in the engine of the printer unit B, and has a different function from that of the LUTb 312. For example, the LUTa 306 is always the latest one regardless of the type of printing medium, whereas the LUTb 312 is switched by the CPU 301 in accordance with the type of printing medium to be used. The LUTa 306 needs to be updated upon environmental changes or an increase in the number (cumulative number) of formed images, whereas the LUTb 312 basically need not be updated as long as the same type of printing medium is used.

When updating the LUTa 306, the LUTb 312 is controlled not to act on the signal. For example, a LUTb 312 whose input and output coincide with each other is read out from the memory 302 and set in the tone control unit 311. Alternatively, the signal path is switched to detour around the LUTb 312.

Procedures to create the LUTb 312 are basically the same as those in the second calibration. First, the CPU 301 updates the LUTa 306 by performing the first calibration and second calibration. The CPU 301 sets the updated LUTa 306 in the tone control unit 311, and sets the LUTid(X) in the color processing unit 303. Further, the CPU 301 performs the second calibration using the second printing medium Z serving as the LUTb creation target. The created LUT is not the LUTa(Z) but the LUTb(Z). In this way, the CPU 301 determines the second data LUTb for adjusting a tone characteristic corresponding to the type of printing medium based on the correspondence between the luminance value and the density of a halftone image of a different tone contained in a pattern image. More specifically, the CPU 301 creates the second image processing condition LUTb for adjusting the tone characteristic in the image forming unit based on a luminance value corresponding to light reflected by the pattern image on the second printing medium Z. When forming an image on the second printing medium Z, the image forming apparatus adjusts the tone characteristic using the first image processing condition LUTa and second image processing condition LUTb. For this purpose, the created LUTb(Z) is saved in the memory 302 in association with identification information indicating the type of second printing medium Z. The LUTid(Z) and correction coefficient can also be created according to the flowchart of FIG. 11. This is because steps S1103 to S1107 are substantially the same as those in the second calibration. Note that the UCR unit 305 is arranged on the subsequent stage of the LUTb(Z) regardless of the type of LUTb(Z) to prevent the amount of applied toner from exceeding a designed value.

Figure 18:
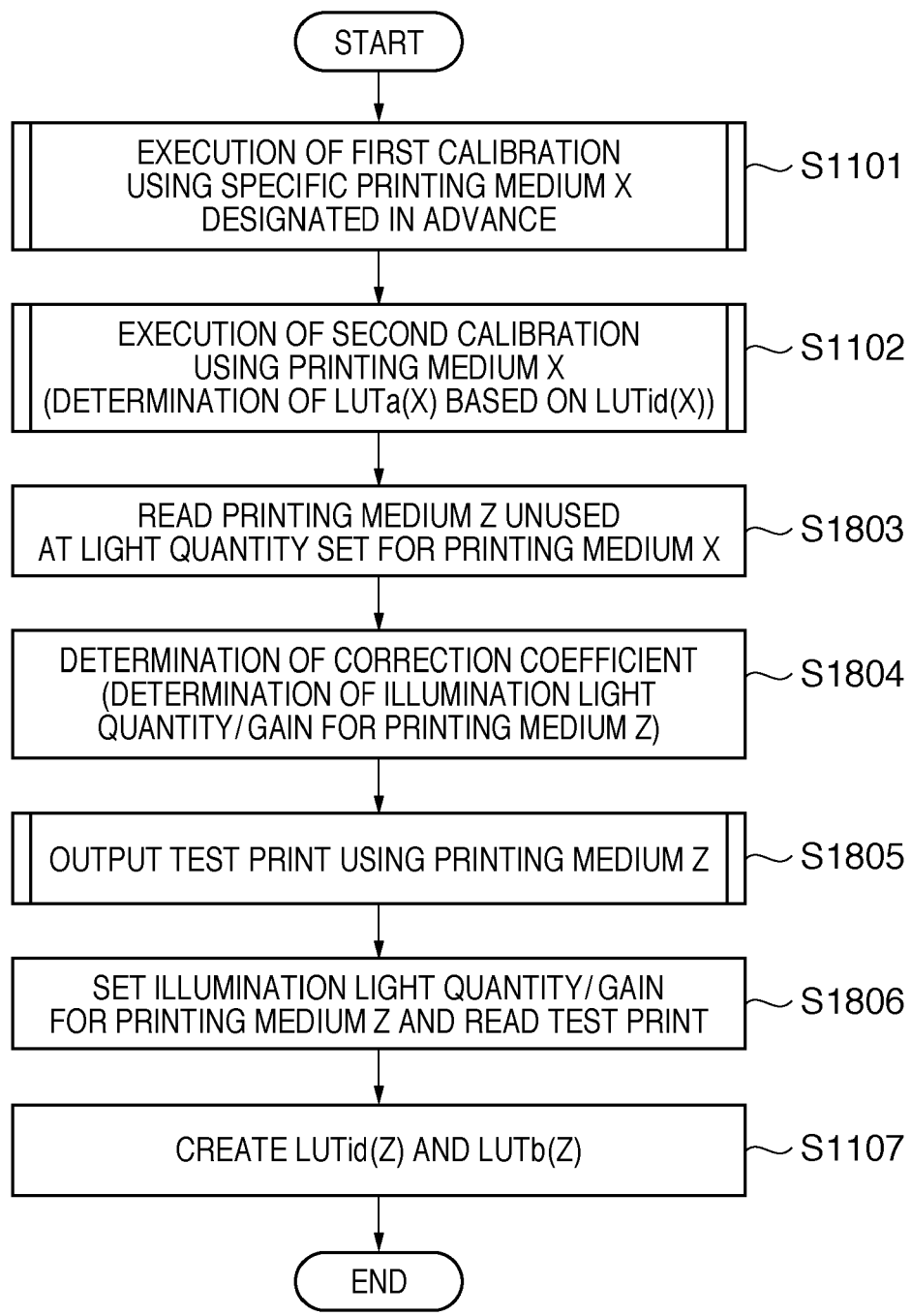
FIG. 18 is a flowchart showing a printing medium adding operation.

In FIG. 11, the correction coefficient is determined by measuring the quantity of light reflected by the background region of the second printing medium Z where a pattern image is formed. However, the correction coefficient may be determined using the quantity of light reflected by the background region of an unused example of second printing medium Z where no pattern image is formed, as shown in FIG. 18. In other words, an unused or virgin sheet of the second printing medium Z, so a sheet that has not had an image formed anywhere on it, is used to determine the correction coefficient. Steps S1803 to S1806 are performed after performing steps S1101 and S1102 (S1502) described above.

In step S1803, the CPU 211 of the reader unit A sets an illumination light quantity for the first printing medium X in the lighting control circuit 220, turns on the light source 103, and controls the CCD sensor 105 to read the unused second printing medium Z. The CPU 211 transfers, to the CPU 301, an image signal containing the luminance value I(Z) of the background that has been created by reading the test print. In step S1804, the CPU 301 determines a correction coefficient for correcting the luminance value based on the image signal received from the CPU 211. Details of the correction coefficient determination processing have already been described. In step S1805, the CPU 301 controls the printer control unit 109 to form the second test pattern on the second printing medium Z. In step S1806, the CPU 301 sets, for the CPU 211, an illumination light quantity or gain determined based on the correction coefficient, and controls the CCD sensor 105 to read the test print. The CPU 211 transfers, to the CPU 301, an image signal containing a luminance value I'(Z) created by reading the test print. The CPU 301 saves the luminance value I'(Z) in the memory 302. In step S1107, the CPU 301 adds the difference between the luminance values I(X) and I'(Z) to the LUTid(X), creating a LUTid(Z). The CPU 301 may create a LUTb(Z) from the obtained data.

The sequence of FIG. 18 is superior to that of FIG. 11 in higher measurement accuracy of the luminance value from the background. In FIG. 11, the background region of a printing medium bearing a pattern image is read, so fog toner or dirt during conveyance may be adhered to the background region. The adhesion of such matter inhibits obtaining an original luminance value from the background region, decreasing the correction coefficient determination accuracy and LUT accuracy. For this reason, the use of an unused printing medium can relatively increase these accuracies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2010-165343 filed Jul. 22, 2010 and 2011-100138 filed Apr. 27, 2011 which are hereby incorporated by reference herein in their entirety.

What is claimed is:

1. An image forming apparatus comprising:
a correction unit configured to correct image data using a correcting condition;
an image forming unit configured to form an image on a recording medium based on the corrected image data;
a reading unit configured to read a patch image formed on the recording medium by the image forming unit, wherein the reading unit includes (i) an illumination unit configured to illuminate the recording medium, and (ii) a sensor configured to output read data according to received light;
a converting unit configured to convert the read data into density data using a converting condition corresponding to the recording medium;
a first generating unit configured to generate the correcting condition based on the density data;
a storage unit configured to store the converting condition corresponding to a first recording medium;
a second generating unit configured to cause the image forming unit to form a patch image on a second recording medium, and to generate the converting condition corresponding to the second recording medium using the read data outputted by the reading unit reading the patch image formed on the second recording medium and the converting condition corresponding to the first recording medium stored in the storage unit;
a setting unit configured to set an emitting light amount of the illuminating unit, wherein the setting unit sets a first light amount if the patch image on the first recording medium is to be read, and sets a second light amount if the patch image on the second recording medium is to be read; and
a determination unit configured to determine the second light amount based on the first light amount and read data of a background region of the second recording medium.

2. The image forming apparatus according to claim 1, wherein the read data of the background region of the second recording medium is read data of the background region the second recording medium outputted from the sensor when the illumination unit illuminates the second recording medium by the first light amount.

3. The image forming apparatus according to claim 1, wherein the determination unit is further configured to determine the second light amount based on read data of the background region of the second recording medium and read data of a background region of the first recording medium, and
read data of the background region of the first recording medium is stored in the storage unit in advance.

4. A method of generating a correcting condition used in an image forming apparatus, the image forming apparatus including a correction unit configured to correct image data using the correcting condition, an image forming unit configured to form an image on a recording medium based on the corrected image data, and a reading unit configured to read a patch image formed on the recording medium by the image forming unit, wherein the reading unit includes (i) an illumination unit configured to illuminate the recording medium and (ii) a sensor configured to output read data according to received light, the method comprising:
a converting step of converting the read data into density data using a converting condition corresponding to the recording medium;
a first generating step configured to generate the correcting condition based on the density data;
a determination step of determining a second light amount corresponding to a second recording medium based on a first light amount corresponding to a first recording medium and read data of a background region of the second recording medium;
a setting step of setting an emitting light amount of the illuminating unit, wherein the setting step includes setting a first light amount if the patch image on the first recording medium is to be read, and setting a second light amount if the patch image on the second recording medium is to be read; and
a second generating step of causing the image forming unit to form a patch image on the second recording medium, causing the illumination unit to illuminate the patch image formed on the second recording medium by the second light amount, and generating the converting condition corresponding to the second recording medium using read data outputted by the sensor reading the patch image and the converting condition corresponding to the first recording medium.

5. The image forming apparatus according to claim 1, wherein the converting unit is further configured to convert first read data outputted by the reading unit reading the patch image formed on the first recording medium into first density data using the first converting condition, and configured to convert second read data outputted by the reading unit reading the patch image formed on the second recording medium into second density data using the second converting condition, and the correcting condition generated by the first generating unit based on the second density data becomes the correcting condition generated by the first generating unit based on the first density data.

6. The image forming apparatus according to claim 1, wherein the second generating unit is further configured to generate the converting condition corresponding to a second recording medium using first read data outputted by the reading unit reading the patch image formed on the first recording medium, second read data outputted by the reading unit reading the patch image formed on the second recording medium and the converting condition corresponding to the first recording medium stored in the storage unit.

7. The image forming apparatus according to claim 1, wherein the reading data is luminance data.

8. The image forming apparatus according to claim 1, wherein the correction unit is further configured to correct a tone characteristic of an image to be formed by the image forming unit.

* * * * *